(12) United States Patent
Subbiah et al.

(10) Patent No.: US 11,294,847 B1
(45) Date of Patent: Apr. 5, 2022

(54) FIBRE CHANNEL HOST ONBOARDING SYSTEM

(71) Applicant: Dell Products L.P., Round Rock, TX (US)

(72) Inventors: Ramesh Kumar Subbiah, Chennai (IN); Vibin Varghese, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/107,322

(22) Filed: Nov. 30, 2020

(51) Int. Cl.
*G06F 13/42* (2006.01)
*G06F 13/40* (2006.01)
*G06F 13/38* (2006.01)
*G06F 13/12* (2006.01)

(52) U.S. Cl.
CPC .......... *G06F 13/426* (2013.01); *G06F 13/126* (2013.01); *G06F 13/382* (2013.01); *G06F 13/409* (2013.01); *G06F 13/4022* (2013.01)

(58) Field of Classification Search
CPC .... G06F 13/426; G06F 13/126; G06F 13/382; G06F 13/4022; G06F 13/409
See application file for complete search history.

(56) References Cited

U.S. PATENT DOCUMENTS

| | | | | |
|---|---|---|---|---|
| 9,787,524 | B1* | 10/2017 | Lutgardo | H04L 67/1097 |
| 2007/0147267 | A1* | 6/2007 | Holland | H04L 49/357 |
| | | | | 370/252 |
| 2007/0174851 | A1* | 7/2007 | Smart | G06F 3/0683 |
| | | | | 719/324 |
| 2009/0282135 | A1* | 11/2009 | Ravindran | G06F 9/4416 |
| | | | | 709/222 |
| 2010/0031257 | A1* | 2/2010 | Ikegaya | G06F 9/5077 |
| | | | | 718/1 |
| 2016/0179555 | A1* | 6/2016 | Shih | G06F 9/4416 |
| | | | | 713/2 |
| 2018/0054353 | A1* | 2/2018 | Hanson | H04L 67/1097 |
| 2018/0357108 | A1* | 12/2018 | Mullender | G06F 3/0613 |

OTHER PUBLICATIONS

INCITS, "Fibre Channel Link Services", Oct. 5, 2016, Rev 3.51 (Year: 2016).*

* cited by examiner

*Primary Examiner* — Phong H Dang
(74) *Attorney, Agent, or Firm* — Joseph Mencher

(57) ABSTRACT

A Fibre Channel host onboarding system includes a Fibre Channel communication subsystem coupled to a host system in a modular computing system. The host system includes a Baseboard Management Controller (BMC) device that retrieves and transmits host system onboarding information associated with the host system. The host system also includes a Host Bus Adapter (HBA) device that is coupled to the BMC device, and that receives the host system onboarding information from the BMC device and, in response, transmits a host system discovery communication that includes the host system onboarding information to the Fibre Channel communication subsystem. When the HBA device determines that a host system discovery acknowledgement communication has been received from the Fibre Channel communication subsystem, it performs Fibre Channel fabric login operations with the Fibre Channel communication system that configure the host system for Fibre Channel communications via the Fibre Channel communication subsystem.

20 Claims, 20 Drawing Sheets

FIBRE CHANNEL HOST ONBOARDING SYSTEM

BACKGROUND

The present disclosure relates generally to information handling systems, and more particularly to onboarding host information handling systems for Fibre Channel communications.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other host systems known in the art, are sometimes included in a modular system chassis and configured as part of a modular system that includes a plurality of the host systems that are coupled via a network to other modular systems (i.e., with other modular system chassis that each may include a plurality of host systems). For example, in conventional Ethernet-based modular systems, Ethernet I/O modules in the modular system chassis of a modular system may communicate via Ethernet protocol(s) and may couple the host systems in that modular system chassis to the network. Those Ethernet I/O modules may require host system onboarding information such as host system chassis information, host system sled information, and host system slot information, in order to onboard the host systems in their module system chassis for Ethernet communications, as well as to determine Ethernet I/O module topologies and/or perform other modular system functionality known in the art.

In such conventional Ethernet-based modular systems, the onboarding of host systems for Ethernet communications is automated via the provisioning of their host system onboarding information to the Ethernet I/O modules using a Baseboard Management Controller (BMC) device in the modular system chassis that collects the host system onboarding information and transmits that host system onboarding information to the Ethernet I/O modules using Link Layer Discovery Protocol (LLDP) Type-Length-Value (TLV) data structures. However, when modular systems are provided that communicate via Fibre Channel protocol(s), the LLDP techniques discussed above that utilize TLVs to transmit the host system onboarding information cannot be interpreted by Fibre Channel I/O modules in the modular system chassis that communicate using that Fibre Channel protocol. Instead, a network administrator or other user is required to manually determine and provide the host system onboarding information to those Fibre Channel I/O modules for use in onboarding the host systems in their modular system chassis for Fibre Channel communications. As such, host system onboarding in Fibre-Channel-based modular systems is a time-consuming, error prone, manual process.

Accordingly, it would be desirable to provide a Fibre Channel host onboarding system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Host Bus Adapter (HBA) engine that is configured to: receive, from a Baseboard Management Controller (BMC) device that is included in the IHS, onboarding information; transmit, in response to receiving the onboarding information, a discovery communication that includes the onboarding information to a Fibre Channel communication subsystem; determine that a discovery acknowledgement communication acknowledging the discovery communication has been received from the Fibre Channel communication subsystem; and perform, with the Fibre Channel communication system in response to receiving the discovery acknowledgement communication, Fibre Channel fabric login operations that configure the IHS for Fibre Channel communications via the Fibre Channel communication subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
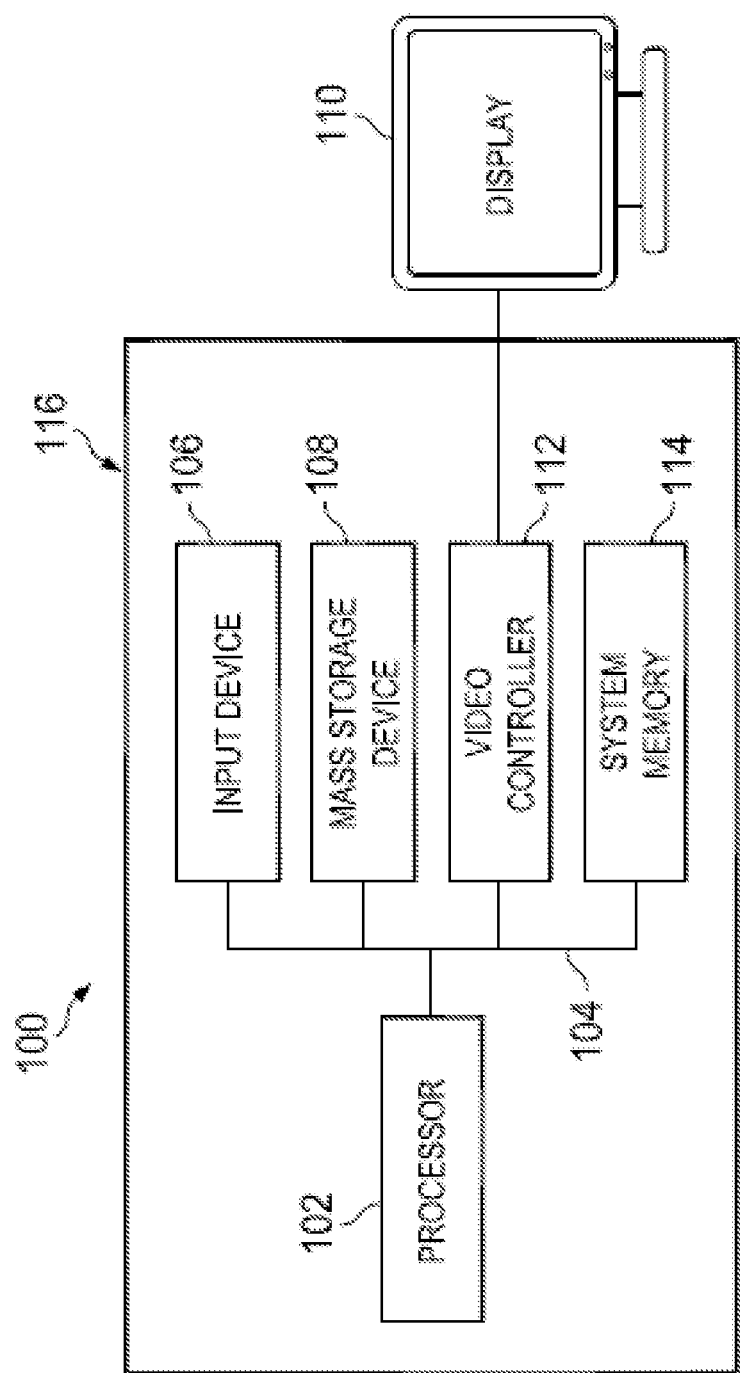
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
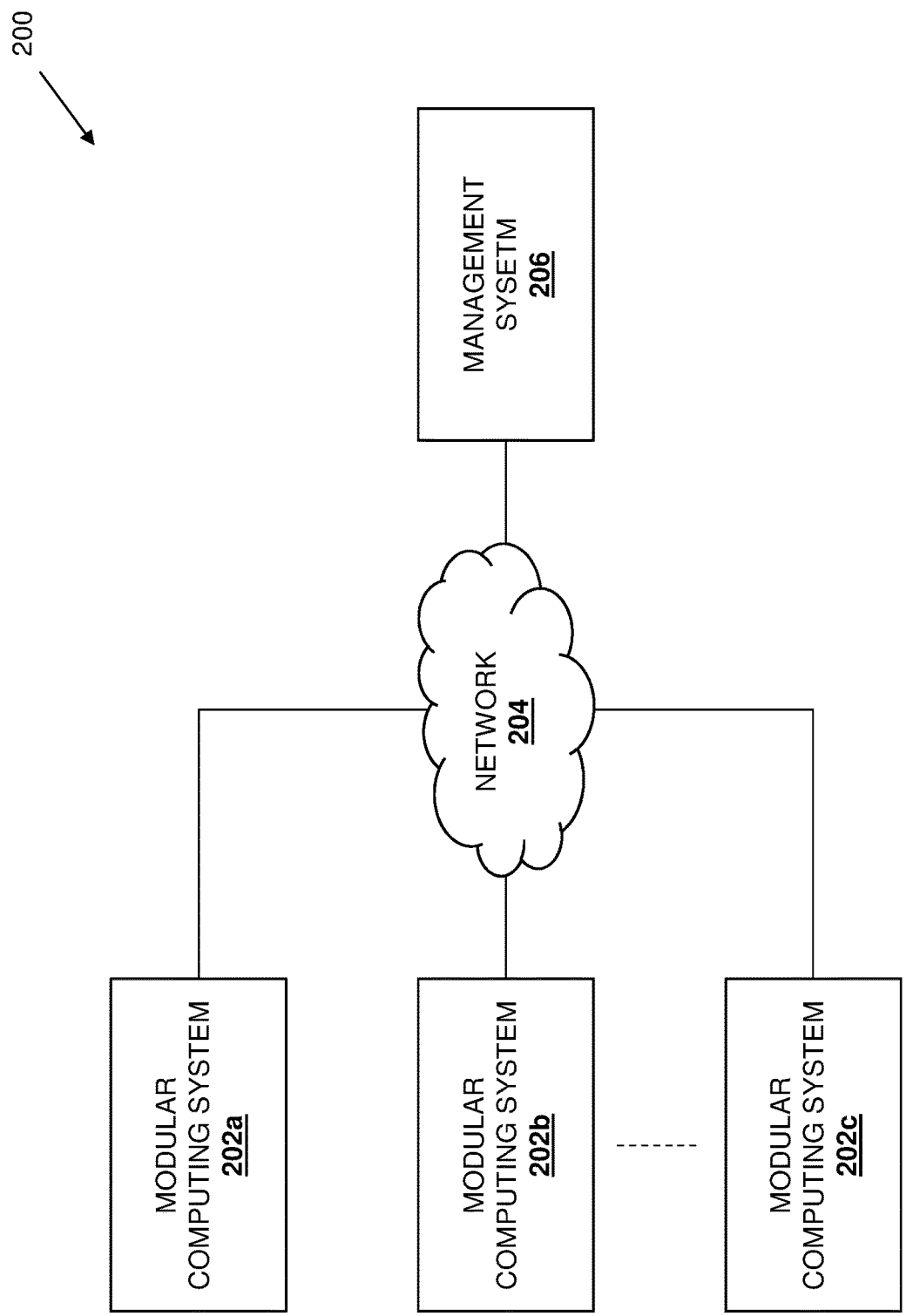
FIG. 2 is a schematic view illustrating an embodiment of a networked system.

Referring now to FIG. 2, an embodiment of a networked system 200 is illustrated. In the illustrated embodiment, the networked system 200 includes a plurality of modular computing systems 202a, 202b, and up to 202c. In an embodiment, any or all of the modular computing systems 202a-202c may be provided by the IHS 100 discussed above with reference to FIG. 1, and/or may include some or all of the components of the IHS 100. In a specific example, each of the modular computing systems 202a-202c may include a chassis housing one or more server devices that may include processing systems, memory systems, storage systems, I/O systems, and/or other computing components, and one of skill in the art in possession of the present disclosure will recognize that those server devices and/or their computing components may be added to and/or removed from the modular computing systems, as well as allocated for the performance of one or more workloads, and/or utilized to perform other modular computing system functions known in the art. However, while illustrated and discussed as including one or more server devices, one of skill in the art in possession of the present disclosure will recognize that modular computing systems provided in the networked system 200 may include any devices that may be configured to operate similarly as discussed below.

In the illustrated embodiment, the modular computing systems 202a-202c are coupled to a network 204 that is discussed below as being provided by a Fibre Channel fabric that one of skill in the art in possession of the present disclosure will recognize may be provided using a variety of Fibre Channel networking components known in the art. In the illustrated embodiment, a management system 206 is coupled to the modular computing systems 202a-202c via the network 204, and may be provided by one or more management server devices that are configured to perform the functionality of the management system 206 discussed below. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
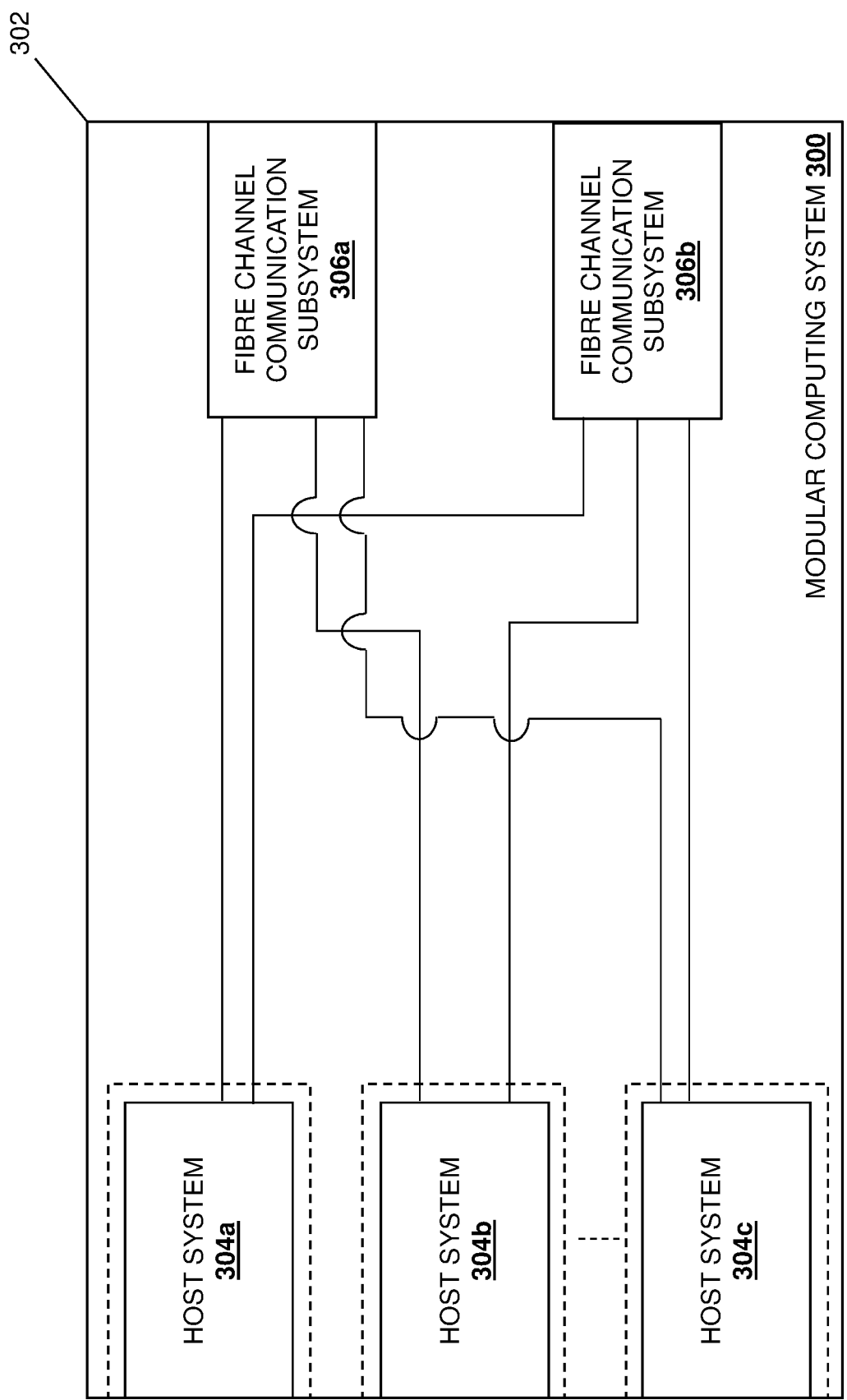
FIG. 3 is a schematic view illustrating an embodiment of a modular computing system that may be included in the networked system of FIG. 2 and that may utilize the Fibre Channel host onboarding system of the present disclosure.

Referring now to FIG. 3, an embodiment of a modular computing system 300 is illustrated that may provide any of the modular computing systems 202a-202c discussed above with reference to FIG. 2. As such, the modular computing system 300 may be provided by the IHS 100 discussed above with reference to FIG. 1 and/or may include some or all of the components of the IHS 100. However, while a specific example is provided below, one of skill in the art in possession of the present disclosure will recognize that the functionality of the modular computing system 300 discussed below may be provided by other devices that are configured to operate similarly as the modular computing system 300 discussed below. In the illustrated embodiment, the modular computing system 300 includes a chassis 302 that houses the components of the modular computing system 300, only some of which are illustrated below. For example, the chassis 302 may house a plurality of host systems 304a, 304b, and up to 304c. In an embodiment, any or all of the host systems 304a, 304b, and up to 304c may be provided by the IHS 100 discussed above with reference to FIG. 1 and/or may include some or all of the components of the IHS 100, and in specific examples may be provided by server devices. However, while described as being provided by server devices, one of skill in the art in possession of the present disclosure will appreciate that the host systems 304a-304c may be provided by other devices while remaining within the scope of the present disclosure as well.

In the illustrated embodiment, the chassis 302 may also house a pair of Fibre Channel communication subsystems 306a and 306b that are each coupled to all of the host systems 304a-304c. In an embodiment, any or all of the Fibre Channel communication subsystems 306a and 306b may be provided by the IHS 100 discussed above with reference to FIG. 1 and/or may include some or all of the components of the IHS 100, and in the specific examples discussed below are provided by Fibre Channel Input/Output modules (e.g., Fibre Channel switch devices) or Fibre Channel fabric expander modules, each of which is discussed in further detail below, and each of which may couple to other Fibre Channel Input/Output modules or Fibre Channel fabric expander modules in other modular computing systems via the Fibre Channel fabric provided by the network 204. However, while described as being provided by Fibre Channel Input/Output modules or Fibre Channel fabric expander modules, one of skill in the art in possession of the present disclosure will appreciate that the Fibre Channel communication subsystems 306a and 306b may be provided by other devices while remaining within the scope of the present disclosure as well. Furthermore, while a specific modular computing system 300 has been illustrated and described, one of skill in the art in possession of the present disclosure will recognize that the modular computing systems of the present disclosure may include a variety of components and component configurations while remaining within the scope of the present disclosure as well.

Figure 4:
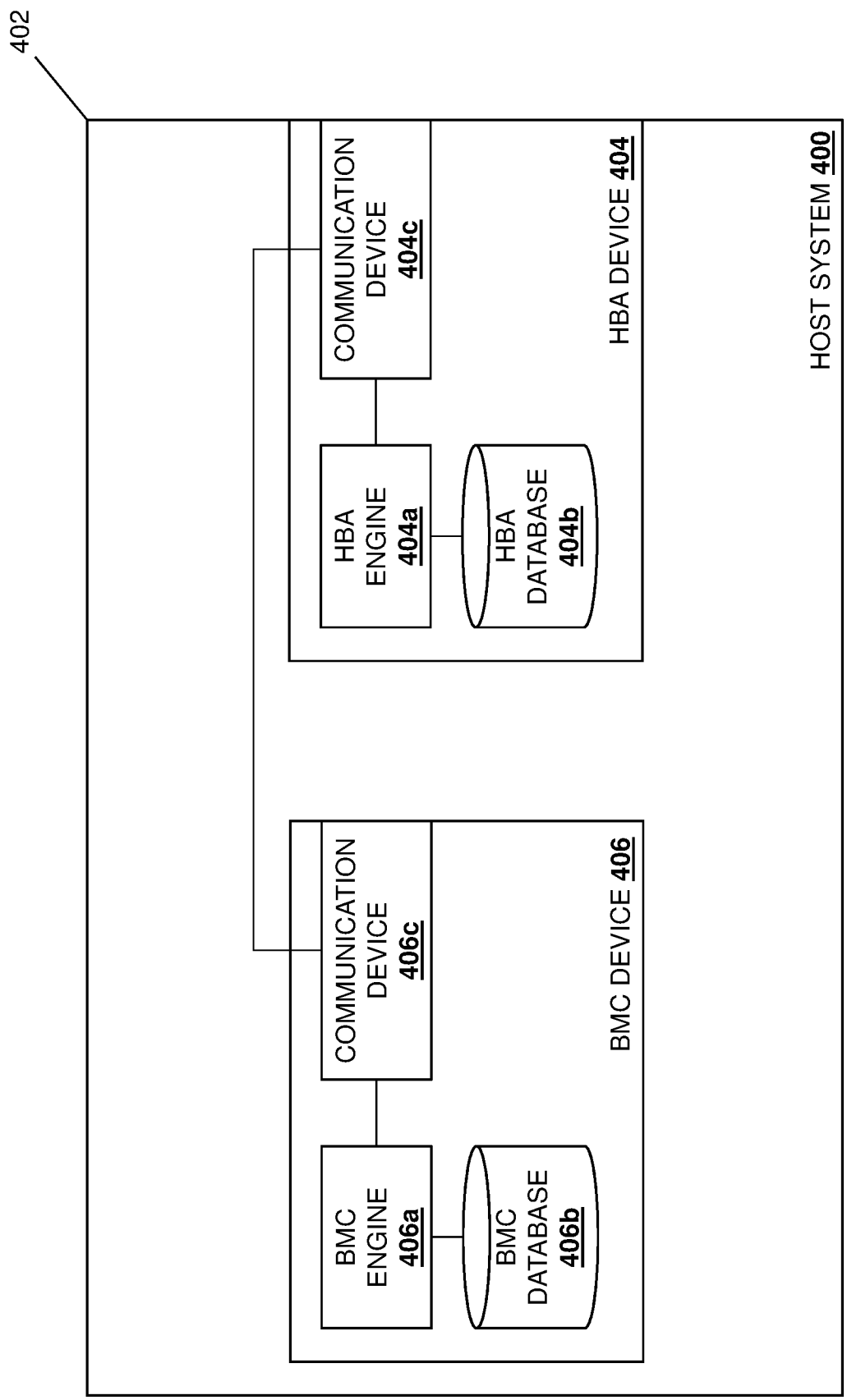
FIG. 4 is a schematic view illustrating an embodiment of a host system that may be included in the modular computing system of FIG. 3 and that may provide the Fibre Channel host onboarding system of the present disclosure.

Referring now to FIG. 4, an embodiment of a host system 400 is illustrated that may provide any of the host systems 304a-304c discussed above with reference to FIG. 3. As such, the host system 400 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the host system 400 discussed below may be provided by other devices that are configured to operate similarly as the host system 400 discussed below. In the illustrated embodiment, the host system 400 includes a chassis 402 that houses the components of the host system 400, only some of which are illustrated below. For example, the chassis 302 may house a Host Bus Adapter (HBA) device 404 that connects the host system 400 to the network 204, and a Baseboard Management Controller (BMC) device 406 that is coupled to the HBA device 404 and that one of skill in the art in possession of the present disclosure will recognize may provide a variety of management functionality (and/or other BMC functionality) known in the art.

In the illustrated embodiment, the HBA device 404 may include an HBA processing system (not illustrated, but which may include the processor 102 discussed above with reference to FIG. 1) and an HBA memory system (not illustrated, but which may include the memory 114 discussed above with reference to FIG. 1) that is coupled to the HBA processing system and that includes instructions that, when executed by the HBA processing system, cause the HBA processing system to provide an HBA engine 404a that is configured to perform the functionality of the HBA engines and/or HBA devices discussed below. The HBA device 404 may also include an HBA storage system (not illustrated, but which may include the storage 108 discussed above with reference to FIG. 1) that is coupled to the HBA engine 404a (e.g., via a coupling between the HBA storage system and the HBA processing system) and that includes an HBA database 404b that is configured to store any of the information utilized by the HBA engine 404a discussed below. The HBA device 404 may also include an HBA communication device 404c that is coupled to the HBA engine 404a (e.g., via a coupling between the HBA communication device 404c and the HBA processing system) and that may be provided by any of a variety of HBA communication components that would be apparent to one of skill in the art in possession of the present disclosure. For example, in the embodiments discussed below, the HBA communication device 404c may include a first HBA port coupled to the Fibre Channel communication subsystem 306a in the modular computing system 300, and a second HBA port coupled to the Fibre Channel communication subsystem 306b in the modular computing system 300.

In the illustrated embodiment, the BMC device 406 may include a BMC processing system (not illustrated, but which may include the processor 102 discussed above with reference to FIG. 1) and a BMC memory system (not illustrated, but which may include the memory 114 discussed above with reference to FIG. 1) that is coupled to the BMC processing system and that includes instructions that, when executed by the BMC processing system, cause the BMC processing system to provide a BMC engine 406a that is configured to perform the functionality of the BMC engines and/or BMC devices discussed below. The BMC device 406 may also include a BMC storage system (not illustrated, but which may include the storage 108 discussed above with reference to FIG. 1) that is coupled to the BMC engine 406a (e.g., via a coupling between the BMC storage system and the BMC processing system) and that includes a BMC database 406b that is configured to store any of the information utilized by the BMC engine 406a discussed below. The BMC device 406 may also include a BMC communication device 406c that is coupled to the BMC engine 406a (e.g., via a coupling between the BMC communication device 406c and the BMC processing system) and that may be provided by any of a variety of BMC communication components that would be apparent to one of skill in the art in possession of the present disclosure.

In the illustrated embodiment, the BMC device 406 is illustrated as being coupled to the HBA device 404 via their respective communications devices 406c and 404c, but one of skill in the art in possession of the present disclosure will appreciate that the BMC device 406 may include a separate, dedicated management network connection to the network 204 (e.g., a management network connection that is separate from the network connection provided by the communication device 404c in the HBA device 404 to the network 204) while remaining within the scope of the present disclosure as well. However, while a specific host system 400 has been illustrated and described, one of skill in the art in possession of the present disclosure will recognize that host systems (or other devices operating according to the teachings of the present disclosure in a manner similar to that described below for the host system 400) may include a variety of components and/or component configurations for providing conventional host system functionality, as well as the functionality discussed below, while remaining within the scope of the present disclosure as well.

Figure 5:
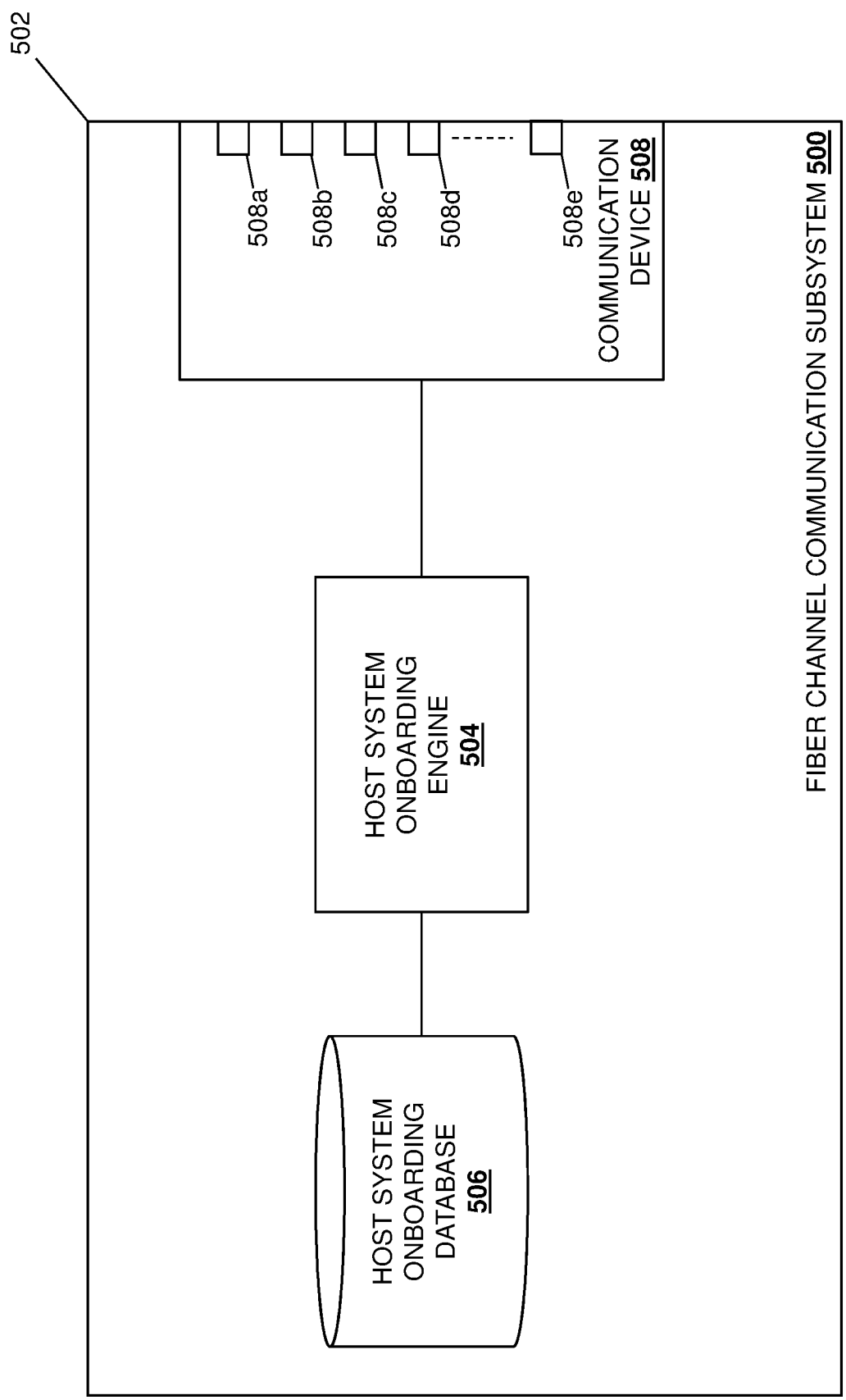
FIG. 5 is a schematic view illustrating an embodiment of a Fibre Channel communication subsystem that may be included in the modular computing system of FIG. 3 and that may provide the Fibre Channel host onboarding system of the present disclosure.

Referring now to FIG. 5, an embodiment of a Fibre Channel communication subsystem 500 is illustrated that may provide any of the Fibre Channel communication subsystems 306a and 306b discussed above with reference to FIG. 2. As such, the Fibre Channel communication subsystem 500 may be provided by the IHS 100 discussed above with reference to FIG. 1 and/or may include some or all of the components of the IHS 100, and in specific examples may be provided by Fibre Channel Input/Output modules (e.g., Fibre Channel switch devices) or Fibre Channel fabric expander modules that one of skill in the art in possession of the present disclosure may be provided by modules that are configured to utilize Fibre Channel protocols in order to communicate. For example, as described below, in some embodiments the Fibre Channel communication subsystem 500 may be provided by a Fibre Channel Input/Output module (e.g., a Fibre Channel switch device) that shares the chassis with the host system being onboarded as discussed below, and operates to onboard that host system. However, in other embodiments, the Fibre Channel communication subsystem 500 may be provided by a Fibre Channel fabric expander module that shares the chassis with the host system being onboarded as discussed below, and that is coupled to a Fiber Channel Input/Output module (e.g., a Fibre Channel switch device) in another modular computing system (e.g., the modular computing system 202b) that operates to onboard that host system.

Furthermore, while illustrated and discussed as being provided by Fibre Channel Input/Output modules or Fibre Channel fabric expander modules, one of skill in the art in possession of the present disclosure will recognize that the functionality of the Fibre Channel communication subsystem 500 discussed below may be provided by other devices that are configured to operate similarly as the Fibre Channel communication subsystem 500 discussed below. In the illustrated embodiment, the Fibre Channel communication subsystem 500 includes a chassis 502 that houses the components of the Fibre Channel communication subsystem 500, only some of which are illustrated below. For example, the chassis 502 may house a Fibre Channel communication processing system (not illustrated, but which may include the processor 102 discussed above with reference to FIG. 1) and a Fibre Channel communication memory system (not illustrated, but which may include the memory 114 discussed above with reference to FIG. 1) that is coupled to the Fibre Channel communication processing system and that includes instructions that, when executed by the Fibre Channel communication processing system, cause the Fibre Channel communication processing system to provide a host system onboarding engine 504 that is configured to perform the functionality of the host system onboarding engines and/or Fibre Channel communication subsystems discussed below.

The chassis 502 may also house a Fibre Channel communication storage system (not illustrated, but which may include the storage 108 discussed above with reference to FIG. 1) that is coupled to the host system onboarding engine 504 (e.g., via a coupling between the Fibre Channel communication storage system and the Fibre Channel communication processing system) and that includes a host system onboarding database 506 that is configured to store any of the information utilized by the host system onboarding engine 504 discussed below. The chassis 502 may also house a communication device 508 that is coupled to the host system onboarding engine 504 (e.g., via a coupling between the communication device 508 and the Fibre Channel communication processing system) and that may be provided by a variety of Fibre Channel communication components that would be apparent to one of skill in the art in possession of the present disclosure. For example, in the illustrated embodiment, the communication device 508 includes a plurality of ports 508a, 508b, 508c, 508d, and up to 508e that, as discussed below, may couple the Fibre Channel communication subsystem 500 to the host systems 304a-304c, to the network 204, and/or to other components included in the modular computing system 300. However, while a specific Fibre Channel communication subsystem 500 has been illustrated and described, one of skill in the art in possession of the present disclosure will recognize that Fibre Channel communication subsystems (or other devices operating according to the teachings of the present disclosure in a manner similar to that described below for the Fibre Channel communication subsystem 500) may include a variety of components and/or component configurations for providing conventional Fibre Channel communication functionality, as well as the functionality discussed below, while remaining within the scope of the present disclosure as well.

Figure 6:
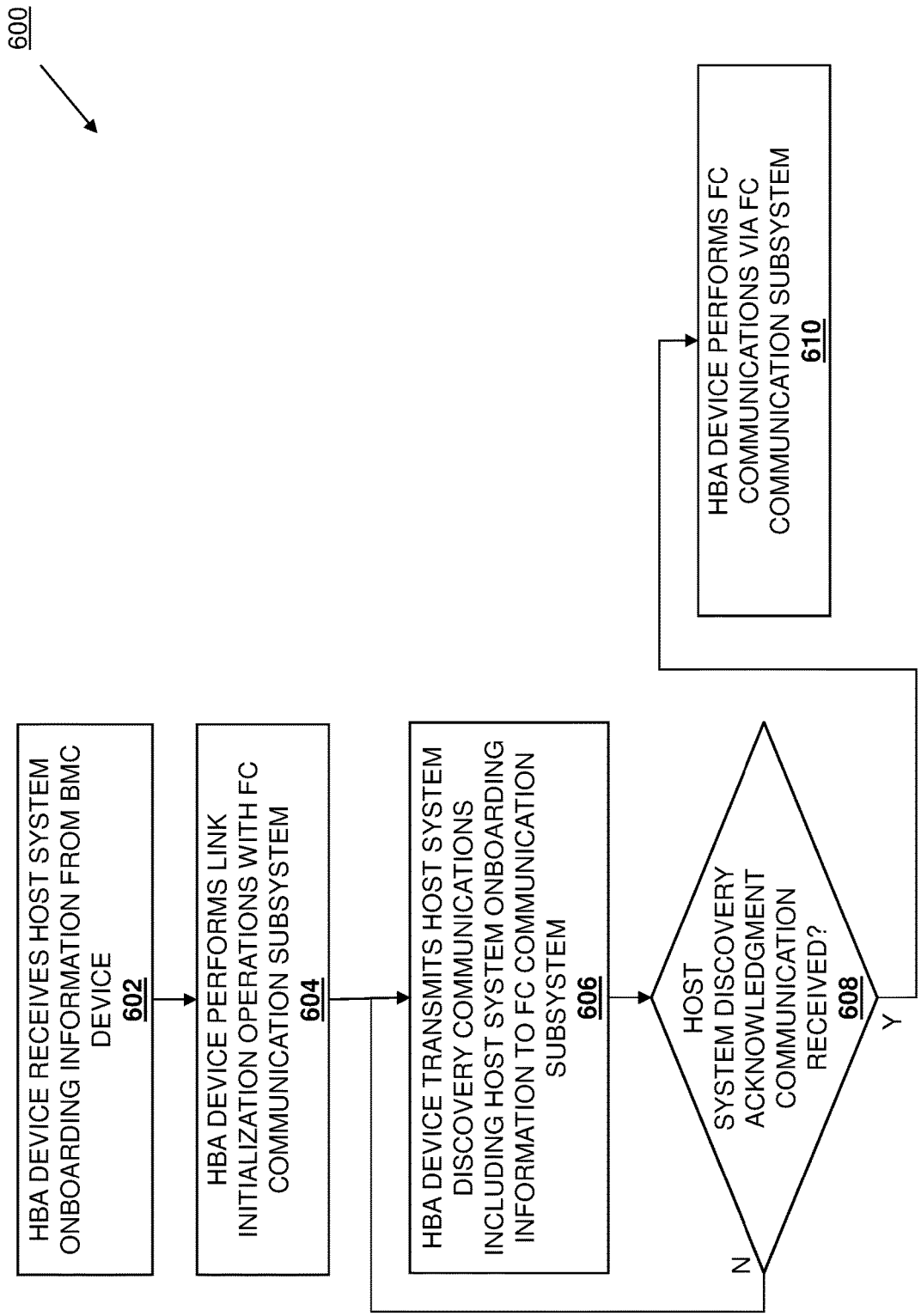
FIG. 6 is a flow chart illustrating an embodiment of a method for onboarding host systems for Fibre Channel communications.

Referring now to FIG. 6, an embodiment of a method 600 for onboarding host systems for Fibre Channel communications is illustrated. As discussed below, the systems and methods of the present disclosure utilize a BMC device in a host system to retrieve host system onboarding information from a host system and provide that host system onboarding information to an HBA device, which allows that HBA device to generate and transmit host system discovery communications (e.g., Extended Link Services (ELS) communications that include the host system onboarding information) to a Fibre Channel communications subsystem for use by that Fibre Channel communications system in automatically onboarding the host system for Fibre Channel communications. For example, the host system of the present disclosure may include a BMC device that retrieves and transmits host system onboarding information associated with the host system to an HBA device in the host system. In response to receiving the host system onboarding information, the HBA device transmits a host system discovery communication that includes the host system onboarding information to a Fibre Channel communication subsystem. When the HBA device then determines that a host system discovery acknowledgement communication has been received from the Fibre Channel communication subsystem, it performs Fibre Channel fabric login operations with the Fibre Channel communication system that configure the host system for Fibre Channel communications via the Fibre Channel communication subsystem. As such host system onboarding in Fibre-Channel-based modular systems is automated, which reduces the time and errors associate with manual host system onboarding operations performed in conventional Fibre-Channel-based modular systems.

In the specific examples provided below, the host system 304a/400 in the modular computing system 202a/300 is onboarded for Fibre Channel communications, but one of skill in the art in possession of the present disclosure will appreciate that any of the hosts systems 304a-304c in any of the modular computing systems 202a-202c may be onboarded for Fibre Channel communications in a similar manner while remaining within the scope of the present disclosure as well.

The method 600 begins at block 602 where an HBA device receives host system onboarding information from a BMC device. In an embodiment, at block 602, the BMC engine 406a in the BMC device 406 included in the host system 304a/400 in the modular computing system 202a/300 may operate to retrieve host system onboarding information associated with the host system 304a/400 in the modular computing system 202a/300. For example, host system onboarding information associated with a host system may include host system chassis information such as a host system chassis service identifier (e.g., a host system chassis service "tag" that identifies the chassis 302 of the modular computing system 300), host system sled information such as a host system sled service identifier (e.g., a host system sled service "tag" that identifies the chassis 402 of the host system 400), host system slot information such as a host system slot identifier (e.g., a sled slot number) for the slot in the modular computing system that houses that host system, a host system port identifier such as an HBA device port identifier (e.g., an HBA device port number) for a port on the HBA device in the host system that connects to the Fibre Channel communication subsystem, a Fibre Channel communication subsystem service identifier (e.g., a Fibre Channel Input/Output module service "tag"), a Fibre Channel communication subsystem module identifier (e.g a Fibre Channel Input/Output module model name), a Fibre Channel communication subsystem slot identifier such as a Fibre Channel I/O module slot identifier (e.g., a Fibre Channel I/O module slot number) for the slot in the modular computing system that houses that Fibre Channel communication subsystem, and/or any other host system onboarding information that would be apparent to one of skill in the art in possession of the present disclosure.

While not described in detail, one of skill in the art in possession of the present disclosure will recognize how the BMC device 406 included in the host system 304a/400 in the modular computing system 202a/300 will have access to any of the host system onboarding information discussed above, and may utilize a variety of BMC device information retrieval techniques and BMC device communication channels for retrieving that host system onboarding information at block 602. In some embodiments, at block 602, the BMC engine 406a in the BMC device 406 included in the host system 304a/400 in the modular computing system 202a/300 may store any host system onboarding information that it has retrieved in its BMC database 406b.

Figure 7:
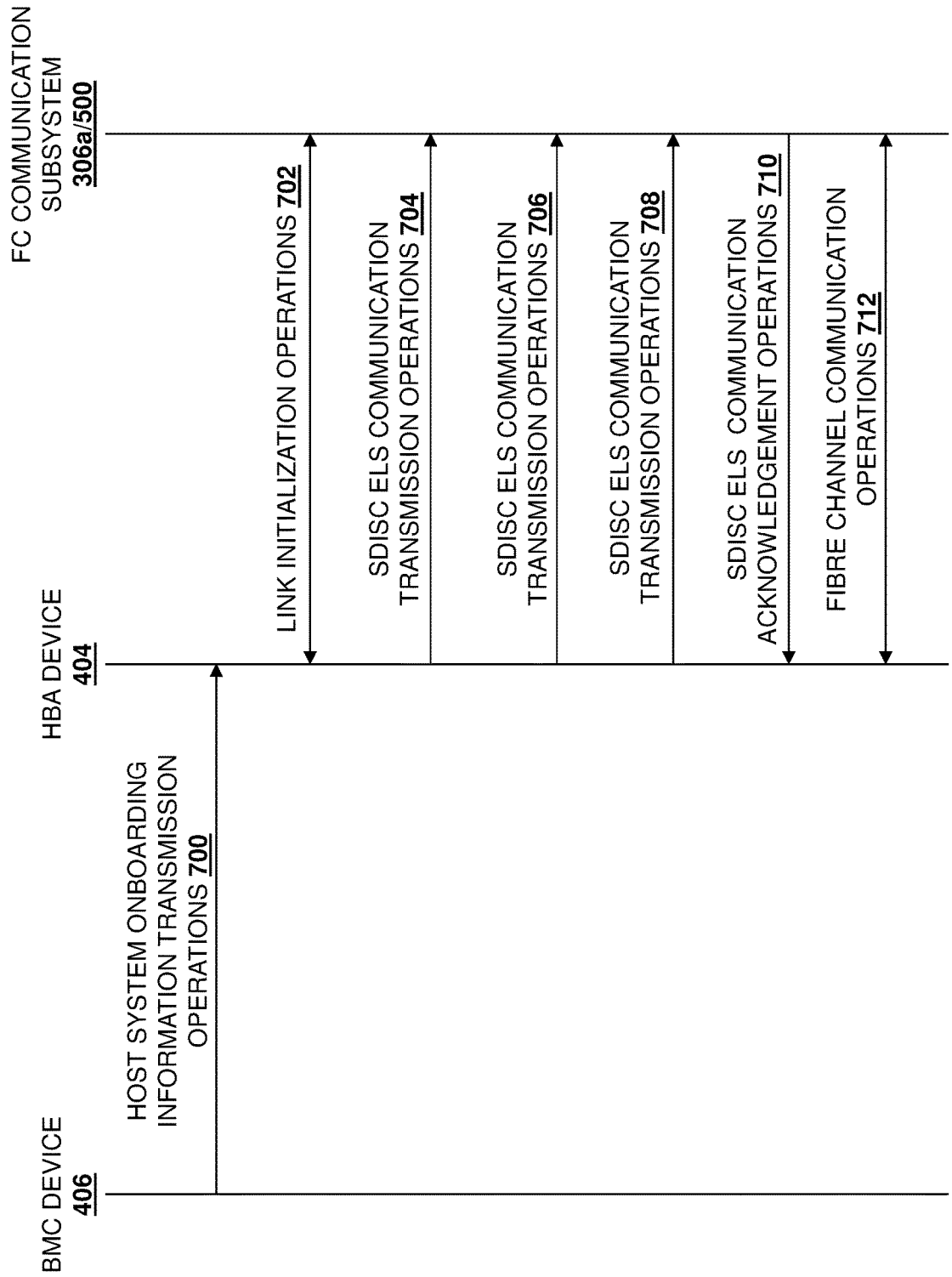
FIG. 7 is a swim-lane diagram illustrating an embodiment of operations performed by the modular computing system of FIG. 3 including the host system of FIG. 4 during the method of FIG. 6.
Figure 8:
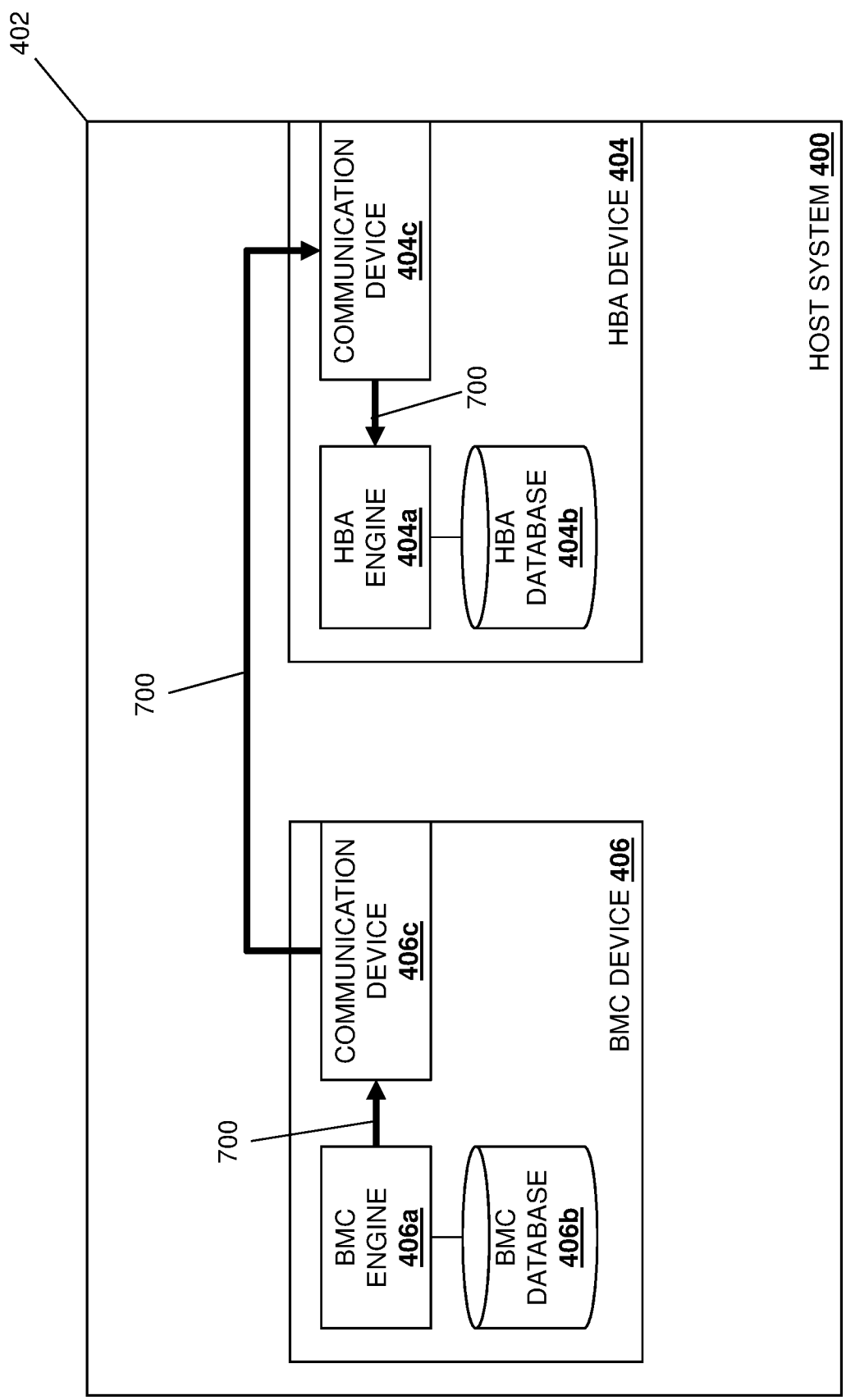
FIG. 8 is a schematic view illustrating an embodiment of the host system of FIG. 4 operating during the method of FIG. 6.

As illustrated in FIG. 7, at block 602, the BMC device 406 included in the host system 304a/400 in the modular computing system 202a/300 may then perform host system onboarding information transmission operations 700 that include transmitting the host system onboarding information to the HBA device 404 included in the host system 304a/400 in the modular computing system 202a/300, which as illustrated in FIG. 8 may include the BMC engine 406a in the BMC device 406 included in the host system 304a/400 in the modular computing system 202a/300 transmitting the host system onboarding information via its communication device 406c and to the HBA device included in the host system 304a/400 in the modular computing system 202a/300 such that the HBA engine 404a in the HBA device 404 included in the host system 304a/400 in the modular computing system 202a/300 receives the host system onboarding information via its communication device 404c. In some embodiments, at block 602, the HBA engine 404a in the HBA device 404 included in the host system 304a/400 in the modular computing system 202a/300 may store any host system onboarding information that it has received from the BMC device 406 in its HBA database 404b.

The method 600 then proceeds to block 604 where the HBA device performs link initialization operations with a Fibre Channel communication subsystem. With reference back to FIG. 7, in an embodiment of block 604, the HBA device 404 included in the host system 304a/400 in the modular computing system 202a/300 may perform link initialization operations 702 with the Fibre Channel communication subsystem 306a/500. In the examples illustrated and described below, the HBA device 404 included in the host system 304a/400 in the modular computing system 202a/300 performs link initialization operations 702 with the Fibre Channel communication subsystem 306a/500 that is provided by a Fibre Channel Input/Output module (e.g., a Fibre Channel switch device) that is included in the modular computing system 202a/300. However, in other examples, the HBA device 404 included in the host system 304a/400 in the modular computing system 202a/300 may perform link initialization operations 702 via the Fibre Channel communication subsystem 306a/500 that is provided by a Fibre Channel fabric expander module that is included in the modular computing system 202a/300 and with a Fibre Channel communication subsystem that is provided by a Fibre Channel Input/Output module (e.g., a Fibre Channel switch device) that is included in another modular computing system (e.g., the modular computing system 202b).

Figure 9A:
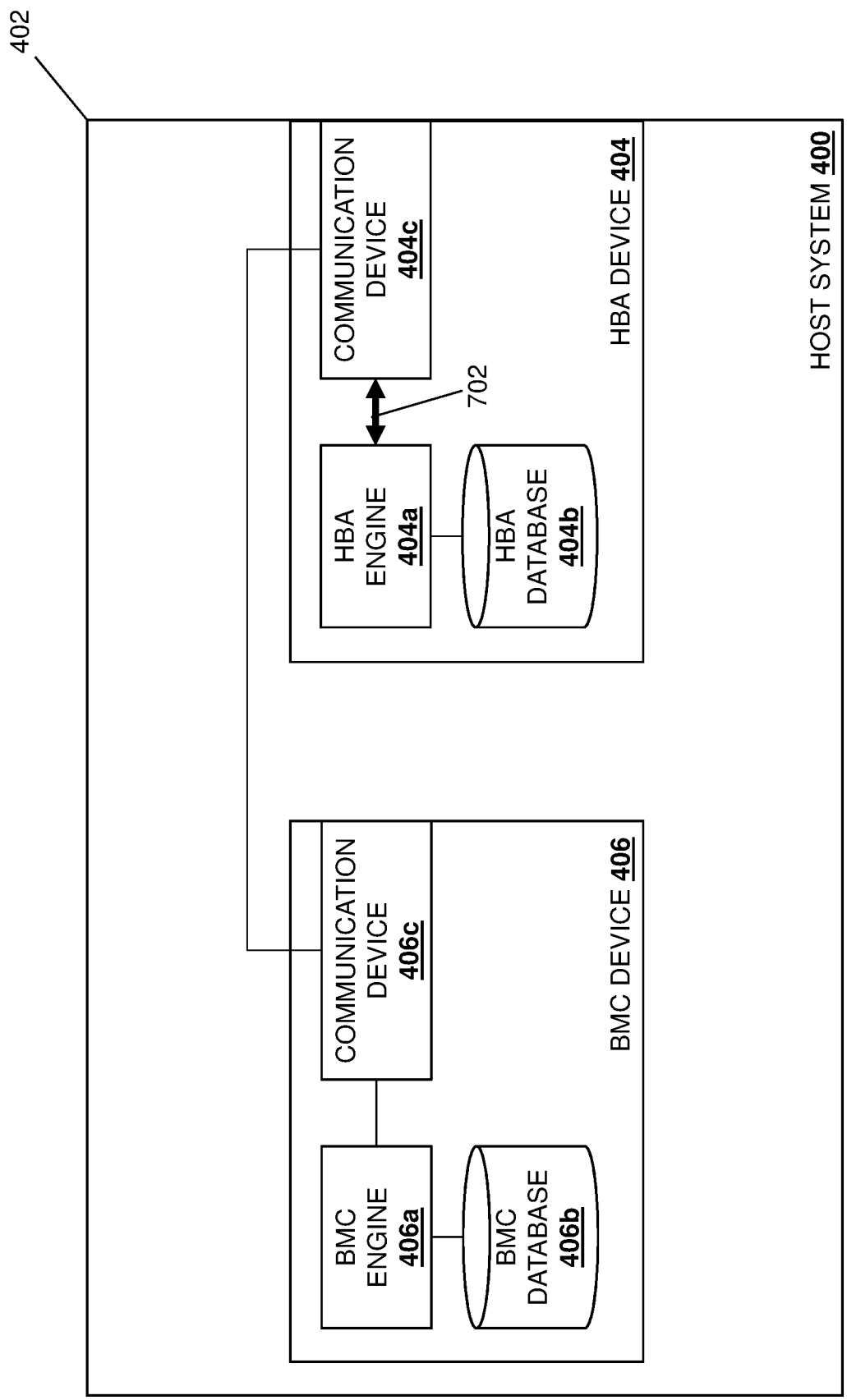
FIG. 9A is a schematic view illustrating an embodiment of the host system of FIG. 4 operating during the method of FIG. 6.
Figure 9B:
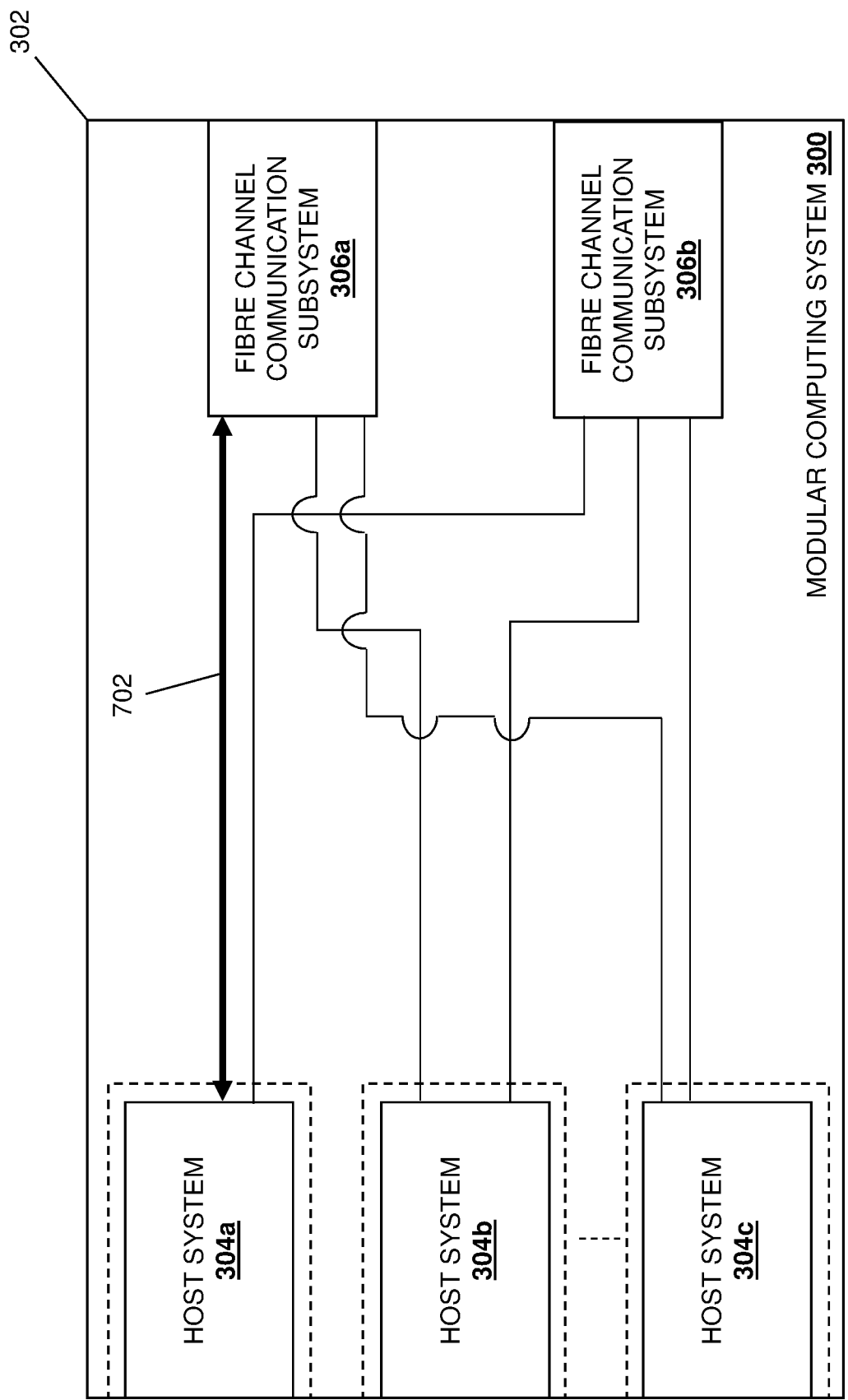
FIG. 9B is a schematic view illustrating an embodiment of the modular computing system of FIG. 3 operating during the method of FIG. 6.
Figure 9C:
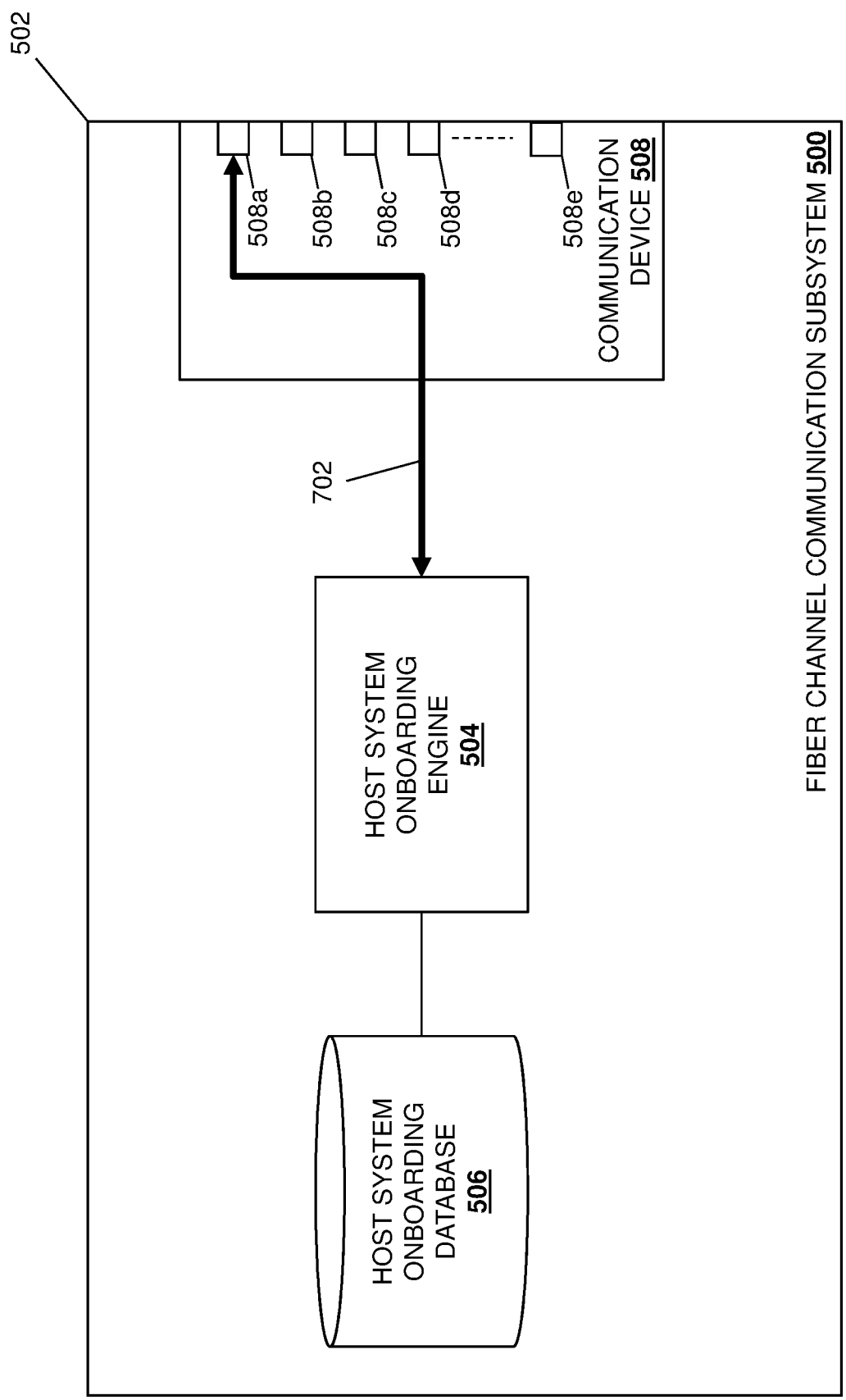
FIG. 9C is a schematic view illustrating an embodiment of the Fiber Channel communication subsystem of FIG. 5 operating during the method of FIG. 6.

For example, FIGS. 9A, 9B, and 9C illustrated how the link initialization operations may include the HBA engine 404a in the HBA device 404 included in the host system 304a/400 in the modular computing system 202a/300 exchanging link initialization communications via its communication device 404c with the Fibre Channel communication subsystem 306a/500 included in the modular computing system 202a/300, and the host system onboarding engine 504 in the Fibre Channel communication subsystem 306a/500 included in the modular computing system 202a/300 exchanging link initialization communications via its communication device 508 (e.g., via the port 508a in the communication device 508 in this example) with the HBA device 404 included in the host system 304a/400 in the modular computing system 202a/300. However, as discussed above, the link initialization operations discussed above may be performed by the HBA device 404 in the modular computing system 202a/300 via a Fibre Channel fabric expander module in that modular computing system 202a/300 and with a Fibre Channel Input/Output module that is included in another modular computing system (e.g., the modular computing system 202b) while remaining within the scope of the present disclosure as well.

While not described in detail, one of skill in the art in possession of the present disclosure will recognize how the HBA device 404 included in the host system 304a/400 in the modular computing system 202a/300 may perform a variety of conventional link initialization operations with the Fibre Channel communication subsystem 306a/500 that may include the exchange of a variety of conventional link initialization communications and/or performance of other link initialization functionality known in the art in order to configure the HBA device 404 included in the host system 304*a*/400 in the modular computing system 202*a*/300 and the Fibre Channel communication subsystem 306*a*/500 to perform any of the communications and/or functionality discussed below. Furthermore, while the link initialization operations 702 are illustrated and discussed as being performed subsequent to the host system onboarding information transmission operations 700, one of skill in the art in possession of the present disclosure will recognize that the link initialization operations 702 may be performed prior to the host system onboarding information transmission operations 700 while remaining within the scope of the present disclosure as well.

The method 600 then proceeds to block 606 where the HBA device transmits host system discovery communications including the host system onboarding information to the Fibre Channel communication subsystem. In an embodiment, at block 606, the HBA engine 404*a* in the HBA device 404 included in the host system 304*a*/400 in the modular computing system 202*a*/300 may generate host system discovery communications using the host system onboarding information. For example, the host system discovery communications generated at block 606 may be Extended Link Services (ELS) communications that are referred to below as "Sled Discovery" (SDISC) ELS communications that one of skill in the art in possession of the present disclosure will recognize are new, unsolicited Fibre Channel ELS communications that includes the host system onboarding information received by the HBA device 404 included in the host system 304*a*/400 in the modular computing system 202*a*/300 at block 602. In a specific example, the SDISC ELS communications may include a source identifier (SID) such as "0x000000", and a destination identifier (DID) such as "0xFFFFFA" (e.g., a DID for a management server). As will be appreciated by one of skill in the art in possession of the present disclosure, Fibre Channel FC switching devices may provide multiple services such as name services, fabric controller services, login services, management service, and/or other services known in the art, and each service may be identified by a specific well-known address (e.g., management services may be identified by the address 0xFFFFFA, and a DID of 0xFFFFFA will then be processed by the management services provided by the Fibre Channel FC switching device(s)).

As such, host system discovery communications generated for a host system may include any of the host system onboarding information discussed above, including host system chassis information such as a host system chassis service identifier (e.g., a host system chassis service "tag"), host system sled information such as a host system sled service identifier (e.g., a host system sled service "tag"), host system slot information such as a host system slot identifier (e.g., a sled slot number) for the slot in the modular computing system that houses that host system, a host system port identifier such as an HBA device port identifier (e.g., an HBA device port number) for a port on the HBA device in the host system that connects to the Fibre Channel communication subsystem, a Fibre Channel communication subsystem service identifier (e.g a Fibre Channel Input/Output module service "tag"), a Fibre Channel communication subsystem module identifier (e.g a Fibre Channel Input/Output module model name), a Fibre Channel communication subsystem slot identifier such as a Fibre Channel I/O module slot identifier (e.g., a Fibre Channel I/O module slot number) for the slot in the modular computing system that houses that Fibre Channel communication subsystem, and/or any other host system onboarding information that would be apparent to one of skill in the art in possession of the present disclosure. In a specific example, the host system discovery communications generated at block 606 may include the following information:

Originator Port Fully Qualified Device Descriptor (FQDD): FC.Mezzanine.1B-1-1
Server Device Model Name: PowerEdgeMX740c
Server Device Service Tag: BLXM8T2
Server Device Slot Number: 2
Server Device Chassis Model Name: PowerEdgeMX7000
Server Device Chassis Service Tag: ST0002S
FC I/O Module Model Name: MX9116nFabricEngine
FC I/O Module Service Tag: 87RRNK2
FC I/O Module Slot Number: B1
FC I/O Module Port Number: 2

With reference back to FIG. 7, in an embodiment of block 606, the HBA device 404 included in the host system 304*a*/400 in the modular computing system 202*a*/300 may perform SDISC ELS communication transmission operations 704 with the Fibre Channel communication subsystem 306*a*/500. Similarly as discussed above, in the examples illustrated and described below the HBA device 404 included in the host system 304*a*/400 in the modular computing system 202*a*/300 performs SDISC ELS communication transmission operations 704 with the Fibre Channel communication subsystem 306*a*/500 that is provided by a Fibre Channel Input/Output module (e.g., a Fibre Channel switch device) that is included in the modular computing system 202*a*/300. However, in other examples, the HBA device 404 included in the host system 304*a*/400 in the modular computing system 202*a*/300 may perform SDISC ELS communication transmission operations 704 via the Fibre Channel communication subsystem 306*a*/500 provided by a Fibre Channel fabric expander module that is included in the modular computing system 202*a*/300 and with a Fibre Channel communication subsystem provided by a Fibre Channel Input/Output module (e.g., a Fibre Channel switch device) that is included in another modular computing system (e.g., the modular computing system 202*b*

Figure 10A:
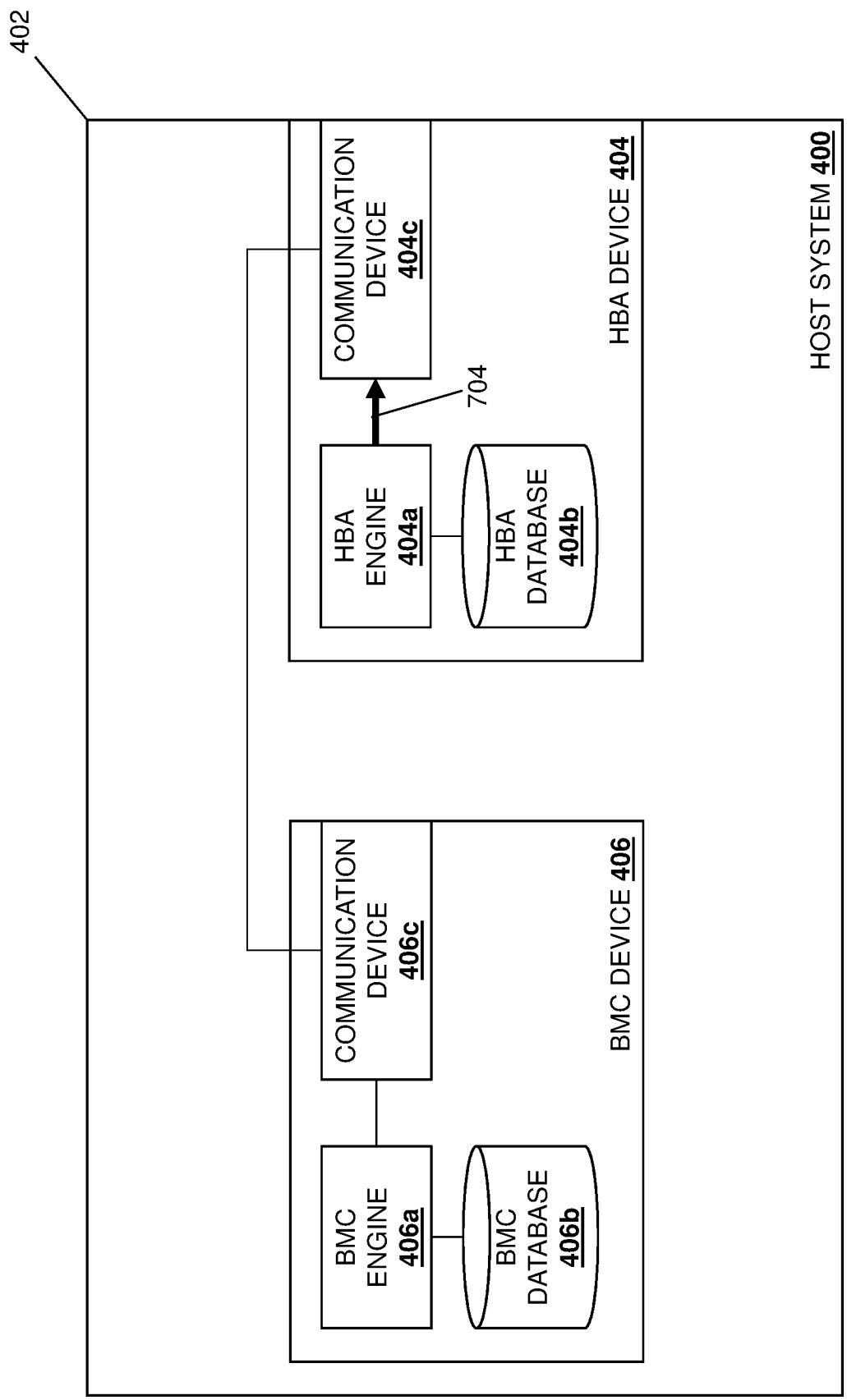
FIG. 10A is a schematic view illustrating an embodiment of the host system of FIG. 4 operating during the method of FIG. 6.
Figure 10B:
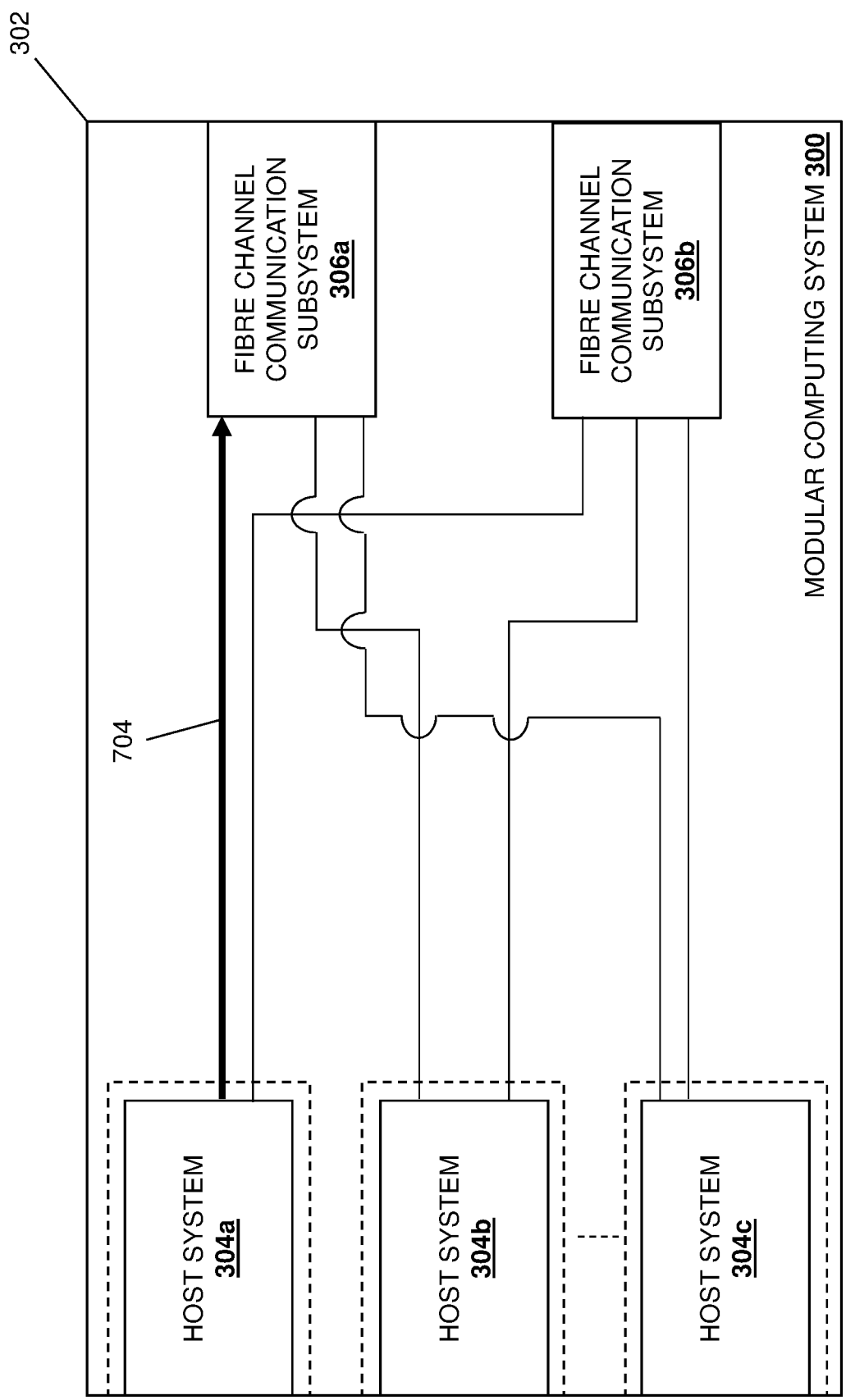
FIG. 10B is a schematic view illustrating an embodiment of the modular computing system of FIG. 3 operating during the method of FIG. 6.

For example, as illustrated in FIGS. 10A and 10B, the SDISC ELS communication transmission operations 704 may include the HBA engine 404*a* in the HBA device 404 included in the host system 304*a*/400 in the modular computing system 202*a*/300 transmitting the host system discovery communications (e.g., provided by the SDISC ELS communications in this example) via its communication device 404*c* and to the Fibre Channel communication subsystem 306*a*/500 included in the modular computing system 202*a*/300. However, while specific SDISC ELS communications are illustrated in FIG. 7 and described herein, one of skill in the art in possession of the present disclosure will appreciate that other host system discovery communications may fall within the scope of the present disclosure as well.

The method 600 then proceeds to decision block 608 where it is determined whether a host system discovery acknowledgement communication has been received. In an embodiment, at decision block 608 and following the transmission of the host system discovery communications (e.g., the SDISC ELS communications as part of the SDISC ELS communication transmission operations 704) to the Fibre Channel communication subsystem 306*a*/500, the HBA engine 404*a* in the HBA device 404 included in the host system 304*a*/400 in the modular computing system 202*a*/300 may monitor for a host system discovery acknowledgement communication from the Fibre Channel communication subsystem 306a/500 included in (or coupled to) the modular computing system 202a/300. For example, following the transmission of the host system discovery communications (e.g., the SDISC ELS communications as part of the SDISC ELS communication transmission operations 704) to the Fibre Channel communication subsystem 306a/500, the HBA engine 404a in the HBA device 404 included in the host system 304a/400 in the modular computing system 202a/300 may determine whether a time period has passed and, if so, may determine that a host system discovery acknowledgement communication has not been received from the Fibre Channel communication subsystem 306a/500.

If, at decision block 608, it is determined that the host system discovery acknowledgement communication has not been received, the method 600 returns to block 606. As such, the method 600 may loop such that such that the HBA engine 404a in the HBA device 404 included in the host system 304a/400 in the modular computing system 202a/300 periodically transmits the host system discovery communications via its communication device 404c and to the Fibre Channel communication subsystem 306a/500 included in (or coupled to) the modular computing system 202a/300 as long as a host system discovery acknowledgement communication has not been received from the Fibre Channel communication subsystem 306a/500. With reference back to FIG. 7, the example provided illustrates how the HBA engine 404a in the HBA device 404 included in the host system 304a/400 in the modular computing system 202a/300 may determine at decision block 608 that no host system discovery acknowledgement communication has been received from the Fibre Channel communication subsystem 306a/500 following the SDISC ELS communication transmission operations 704 and, in response, may return to block 606 to perform SDISC ELS communication transmission operations 706 with the Fibre Channel communication subsystem 306a/500 to transmit the host system discovery communications (e.g., provided by the SDISC ELS communications in this example) via its communication device 404c and to the Fibre Channel communication subsystem 306a/500.

Similarly, the example provided in FIG. 7 illustrates how the HBA engine 404a in the HBA device 404 included in the host system 304a/400 in the modular computing system 202a/300 may determine at the second iteration of decision block 608 that no host system discovery acknowledgement communication has been received from the Fibre Channel communication subsystem 306a/500 included in (or coupled to) the modular computing system 202a/300 following the SDISC ELS communication transmission operations 706 and, in response, may return to block 606 to perform SDISC ELS communication transmission operations 708 with the Fibre Channel communication subsystem 306a/500 to transmit the host system discovery communications (e.g., provided by the SDISC ELS communications in this example) via its communication device 404c and to the Fibre Channel communication subsystem 306a/500.

If at decision block 608, it is determined that the host system discovery acknowledgement communication has been received, the method 600 proceeds to block 610 where the HBA device performs Fibre Channel communications (e.g., login operations such as FLOGIs, PLOGIs, and/or other login operations known in the art) via the Fibre Channel communication subsystem. Similarly as discussed above, in the examples illustrated and described below, the Fibre Channel communications at block 610 may be performed by the HBA device 404 included in the host system 304a/400 in the modular computing system 202a/300 via the Fibre Channel communication subsystem 306a/500 provided by a Fibre Channel Input/Output module (e.g., a Fibre Channel switch device) that is included in the modular computing system 202a/300. However, in other examples, the Fibre Channel communications at block 610 may be performed by the HBA device 404 included in the host system 304a/400 in the modular computing system 202a/300 through the Fibre Channel communication subsystem 306a/500 provided by a Fibre Channel fabric expander module that is included in the modular computing system 202a/300 and via a Fibre Channel communication subsystem provided by a Fibre Channel Input/Output module (e.g., a Fibre Channel switch device) that is included in another modular computing system (e.g., the modular computing system 202b).

Figure 11A:
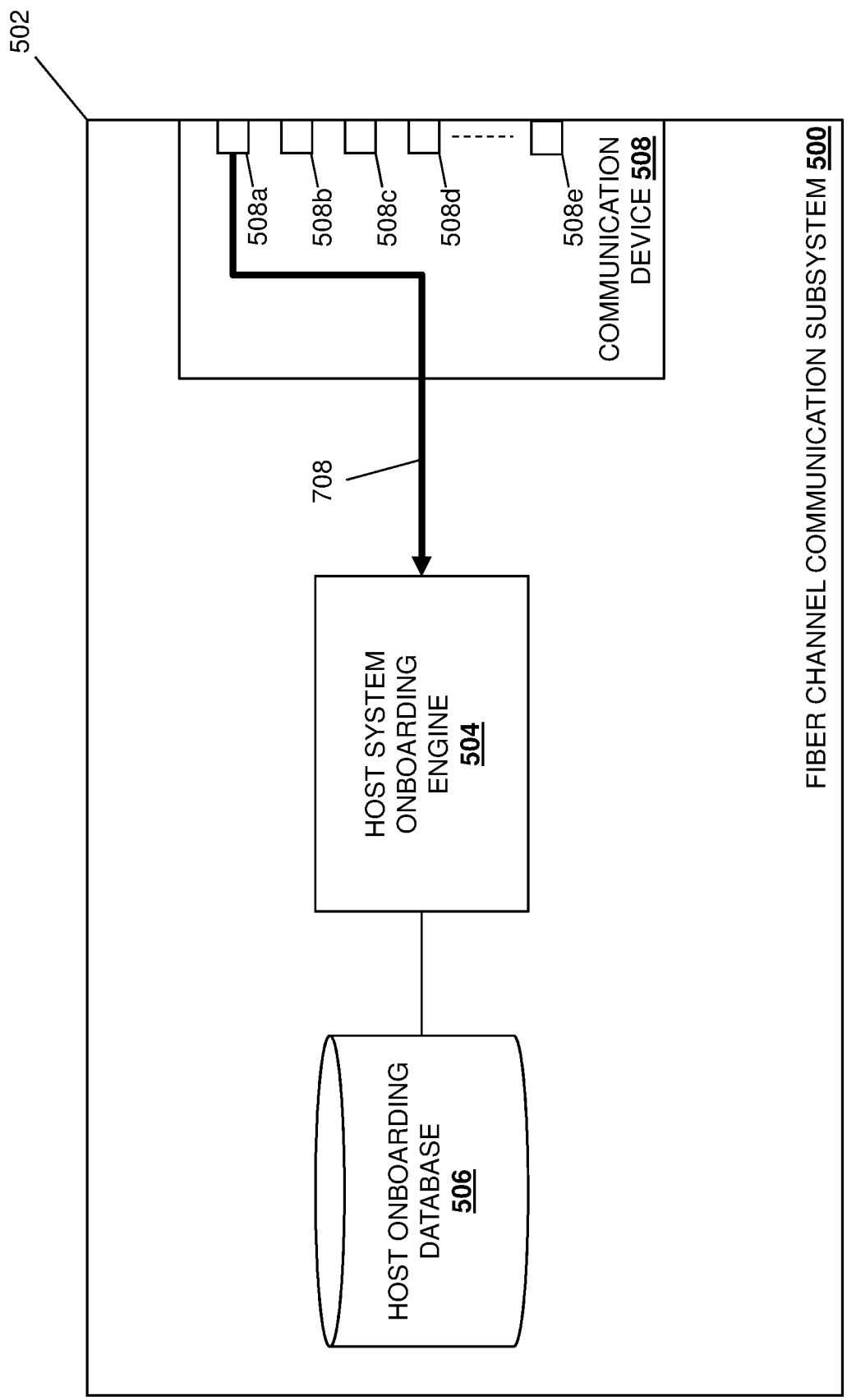
FIG. 11A is a schematic view illustrating an embodiment of the Fiber Channel communication subsystem of FIG. 5 operating during the method of FIG. 6.

However, prior to the performance of the Fibre Channel communications at block 610, the host system 304a/400 must be onboarded for Fibre Channel communications with the Fibre Channel communication subsystem 306a/500. For example, as illustrated in FIG. 11A and returning to decision block 608, the host system onboarding engine 504a in the Fibre Channel communication subsystem 306a/500 included in the modular computing system 202a/300 may receive the SDISC ELS communications as part of the SDISC ELS communication transmission operations 708 via its communication device 508 (e.g., the port 508a in the communication device 508 in this example).

In some embodiments, in response to receiving the SDISC ELS communications via an HBA-device-connected-port (e.g., the port 508a in this example), those SDISC ELS communications may be processed by the host system onboarding engine 504a in the Fibre Channel communication subsystem 306a/500 to determine configurations associated with the host system sled service identifier (e.g., a host system sled service "tag") and the host system slot identifier (e.g., a sled slot number), and provide those configurations (e.g., vfabric associations) on a corresponding Fibre-Channel-fabric-connected port in its communication device 508 (e.g., a port 508b-508e that is connected to the network 204). Furthermore, those SDISC ELS communications may also be processed by the host system onboarding engine 504a in the Fibre Channel communication subsystem 306a/500 to use the host system chassis service identifier (e.g., a host system chassis service "tag"), the Fibre Channel communication subsystem service identifier (e.g a Fibre Channel Input/Output module service "tag"), and the Fibre Channel communication subsystem module identifier (e.g a Fibre Channel Input/Output module model name) in order to discover Fibre Channel fabric expander modules. Further still, those SDISC ELS communications may also be processed by the host system onboarding engine 504a in the Fibre Channel communication subsystem 306a/500 to validate a Fibre Channel Input/Output module-Fibre Channel fabric expander module topology (e.g., to determine whether redundant paths are maintained between HBA device(s) and Input/Output module(s).

In a specific example and prior to onboarding a host system, the Fibre Channel Input/Output module-Fibre Channel fabric expander module topology validation discussed above may include the host system onboarding engine 504a in the Fibre Channel communication subsystem 306a/500 using the host system chassis service identifier (e.g., a host system chassis service "tag") and the host system slot identifier (e.g., a sled slot number) in the SDISC ELS communications to confirm that the Fibre Channel Input/

Output module-Fibre Channel fabric expander module topology (e.g., a Fibre Channel switch device/Fibre Channel fabric expander module topology) is supported such that the host system may be onboarded. In other specific examples, the configuration and/or discovery operations discussed above may include the host system onboarding engine 504*a* in the Fibre Channel communication subsystem 306*a*/500 mapping host-system-facing-port in its communication device 508 to a reserved SDISC Virtual Local Area Network (VLAN), applying Access Control List (ACL) rules to forward SDISC ELS communications to a Fibre Channel management system, and determining Fibre Channel fabric details for the host system sled service identifier (e.g., a host system sled service "tag") or the host system slot identifier (e.g., a sled slot number) to map that host system to a configuration and add the corresponding Fibre-Channel-fabric-connected port to a virtual fabric (vfabric) to onboard that host system. In another specific example and subsequent to onboarding a host system, the host system onboarding engine 504*a* in the Fibre Channel communication subsystem 306*a*/500 may then transmit the SDISC ELS communication acknowledgement discussed in further detail below.

Figure 11B:
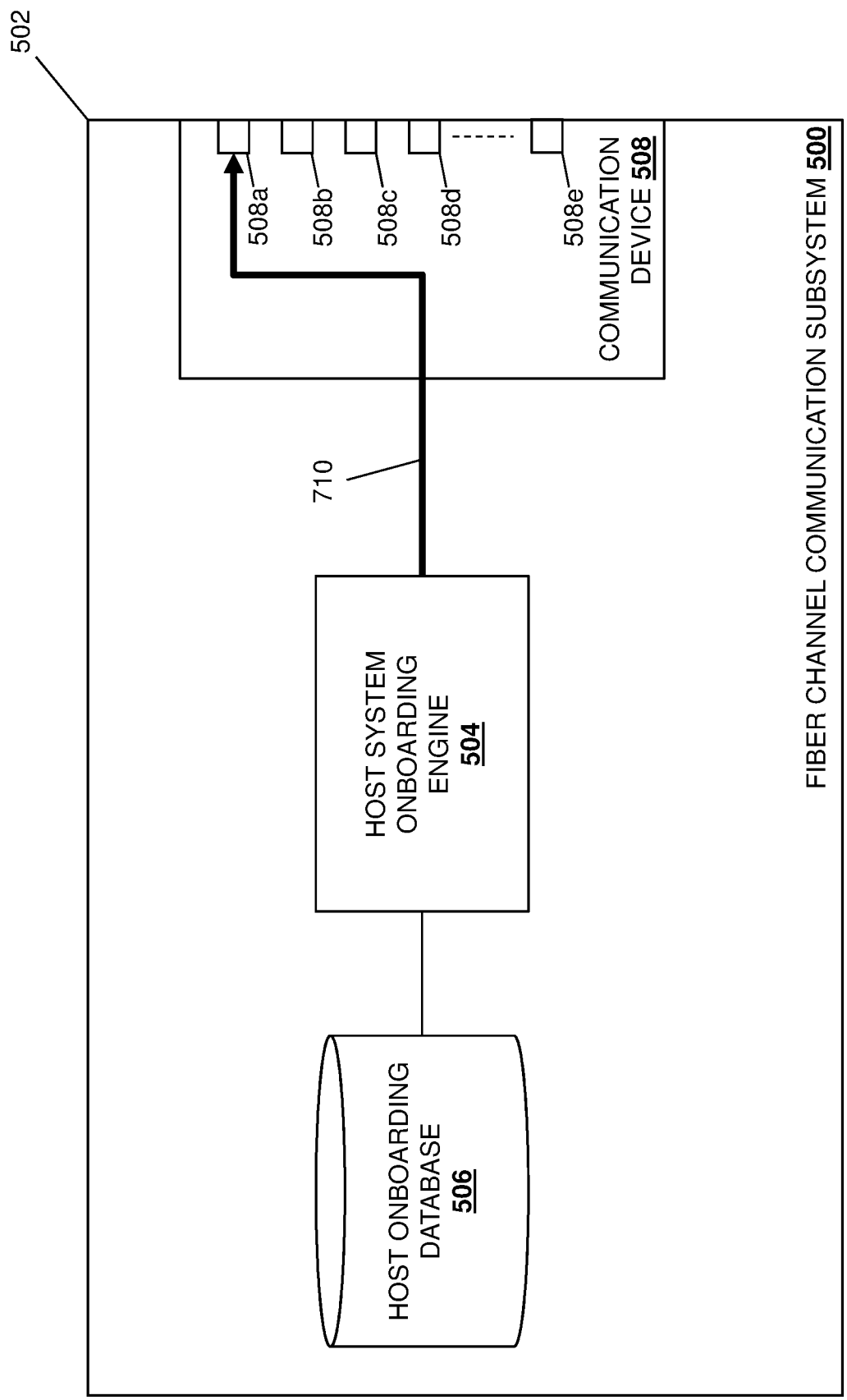
FIG. 11B is a schematic view illustrating an embodiment of the Fiber Channel communication subsystem of FIG. 5 operating during the method of FIG. 6.
Figure 11C:
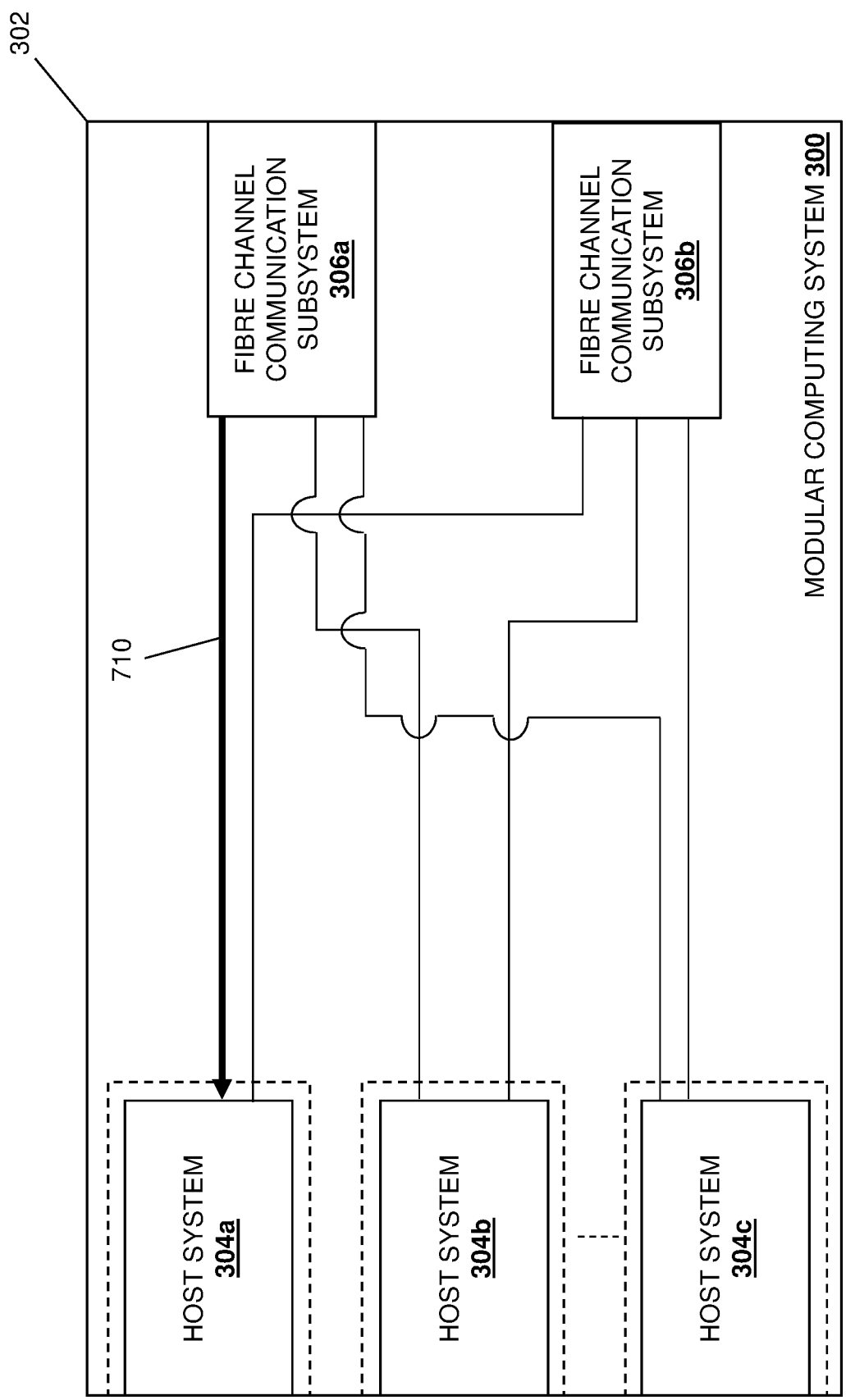
FIG. 11C is a schematic view illustrating an embodiment of the modular computing system of FIG. 3 operating during the method of FIG. 6.
Figure 11D:
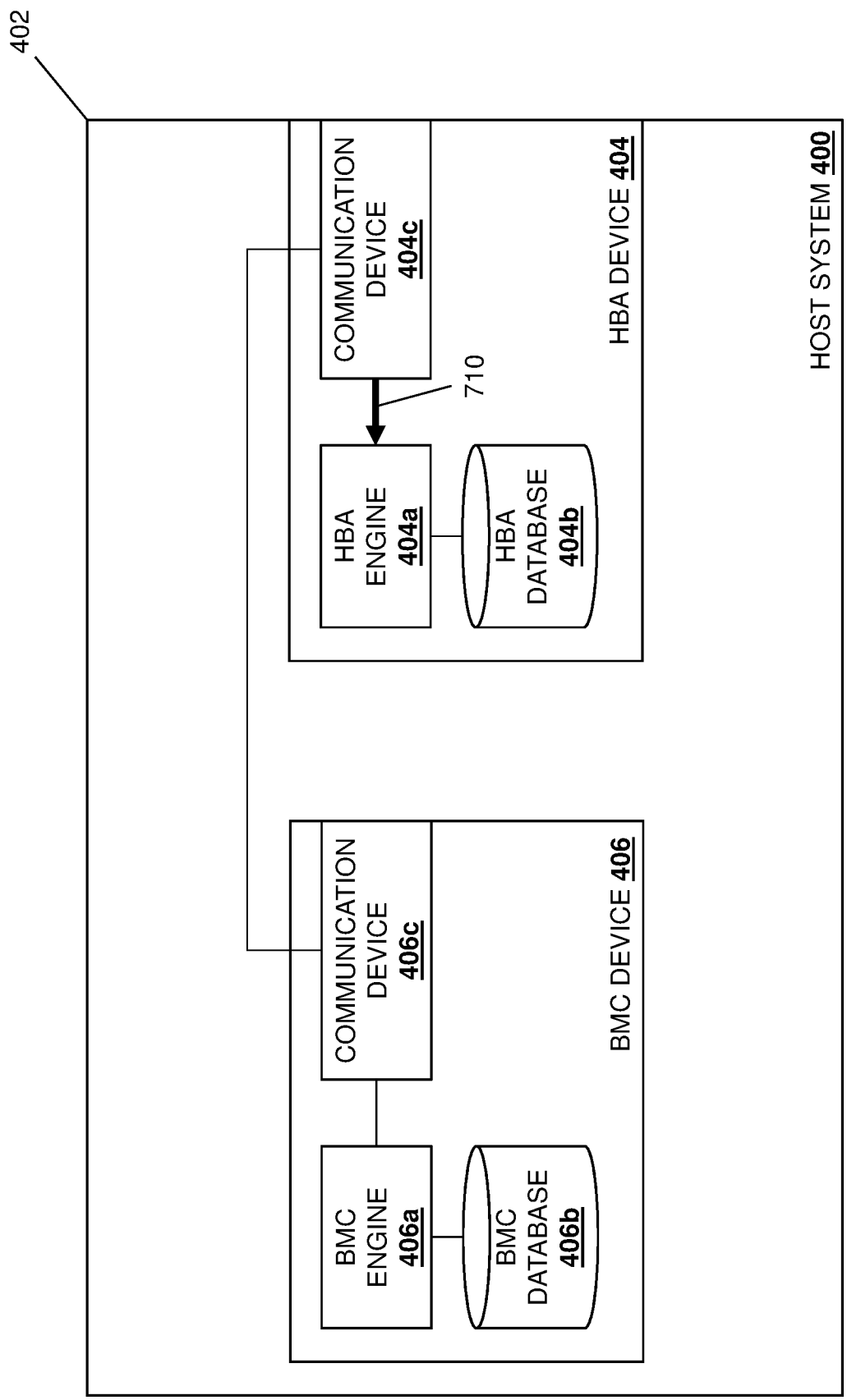
FIG. 11D is a schematic view illustrating an embodiment of the host system of FIG. 4 operating during the method of FIG. 6.

As illustrated in FIGS. 11B, 11C, and 11C, and in response to receiving the SDISC ELS communication and onboarding the host system 304*a*/400 as discussed above, the Fibre Channel communication subsystem 306*a*/500 (e.g., a Fibre Channel Input/Output module) included in the modular computing system 202*a*/300 may perform SDISC ELS communication acknowledgement operations 708 that may include generating the SDISC ELS communication acknowledgement, transmitting that SDISC ELS communication acknowledgement via its communication device 508 (e.g., the port 508*a* in the communication device 508 in this example) and to the host system 304*a* in the modular computing system 202*a*/300, with the HBA engine 404*a* in the HBA device 404 included in the host system 304*a*/400 in the modular computing system 202*a*/300 receiving that SDISC ELS communication acknowledgement via its communication device 404*c*. However, as discussed above, in other embodiments, SDISC ELS communication acknowledgement operations 708 may be performed by a Fibre Channel Input/Output module in a different modular computing system (e.g., the modular computing system 202*b*) and via a Fibre Channel fabric expander module that is included in the same modular computing system 202*a*/300 as the host system 304*a*/400 that was onboarded. Furthermore, while specific SDISC ELS communication acknowledgements are illustrated in FIG. 7 and described herein, one of skill in the art in possession of the present disclosure will appreciate that other host system discovery communication acknowledgements may fall within the scope of the present disclosure as well.

While not described in detail, one of skill in the art in possession of the present disclosure will recognize how the HBA device 404 included in the host system 304*a*/400 in the modular computing system 202*a*/300 may, in response to receiving the SDISC ELS communication acknowledgments, perform a variety of conventional fabric login (e.g., FLOGI) operations with the Fibre Channel communication subsystem 306*a*/500 included in (or coupled to) the modular computing system 202*a*/300 that may include the exchange of a variety of conventional fabric login (e.g., FLOGI) communications and/or other fabric login (e.g., FLOGI) functionality known in the art in order to configure the host system 304*a*/400 in the modular computing system 202*a*/300 for Fibre Channel communications via the Fibre Channel communication subsystem 306*a*/500. One of skill in the art in possession of the present disclosure will appreciate that such FLOGI operations by the HBA device 404 included in the host system 304*a*/400 in the modular computing system 202*a*/300 cannot be honored until the vfabric configurations are applied on the host-system-facing ports on the Fibre Channel communication subsystem 306*a*/500 included in (or coupled to) the modular computing system 202*a* based on the SDISC ELS communications discussed above.

Figure 12A:
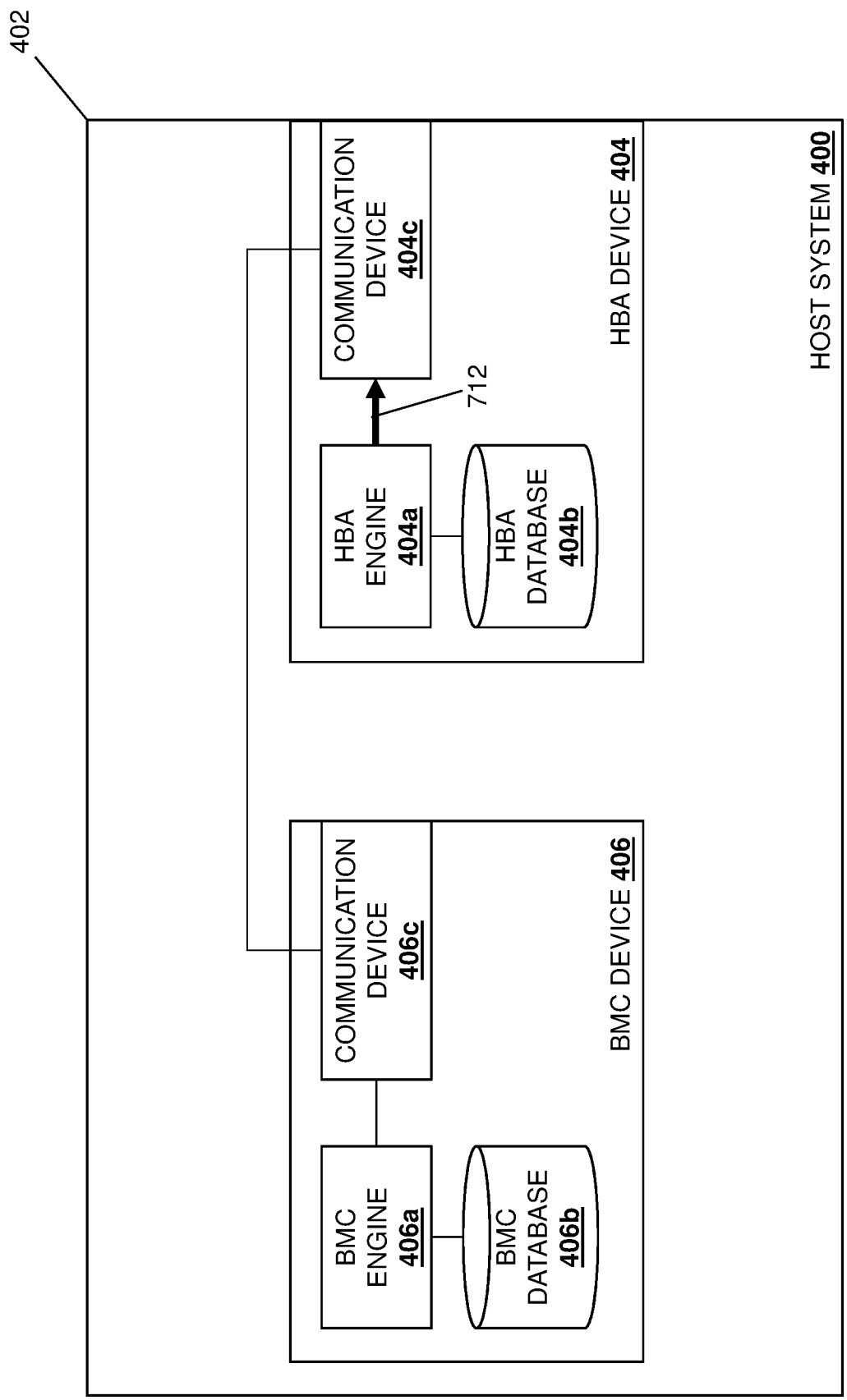
FIG. 12A is a schematic view illustrating an embodiment of the host system of FIG. 4 operating during the method of FIG. 6.
Figure 12B:
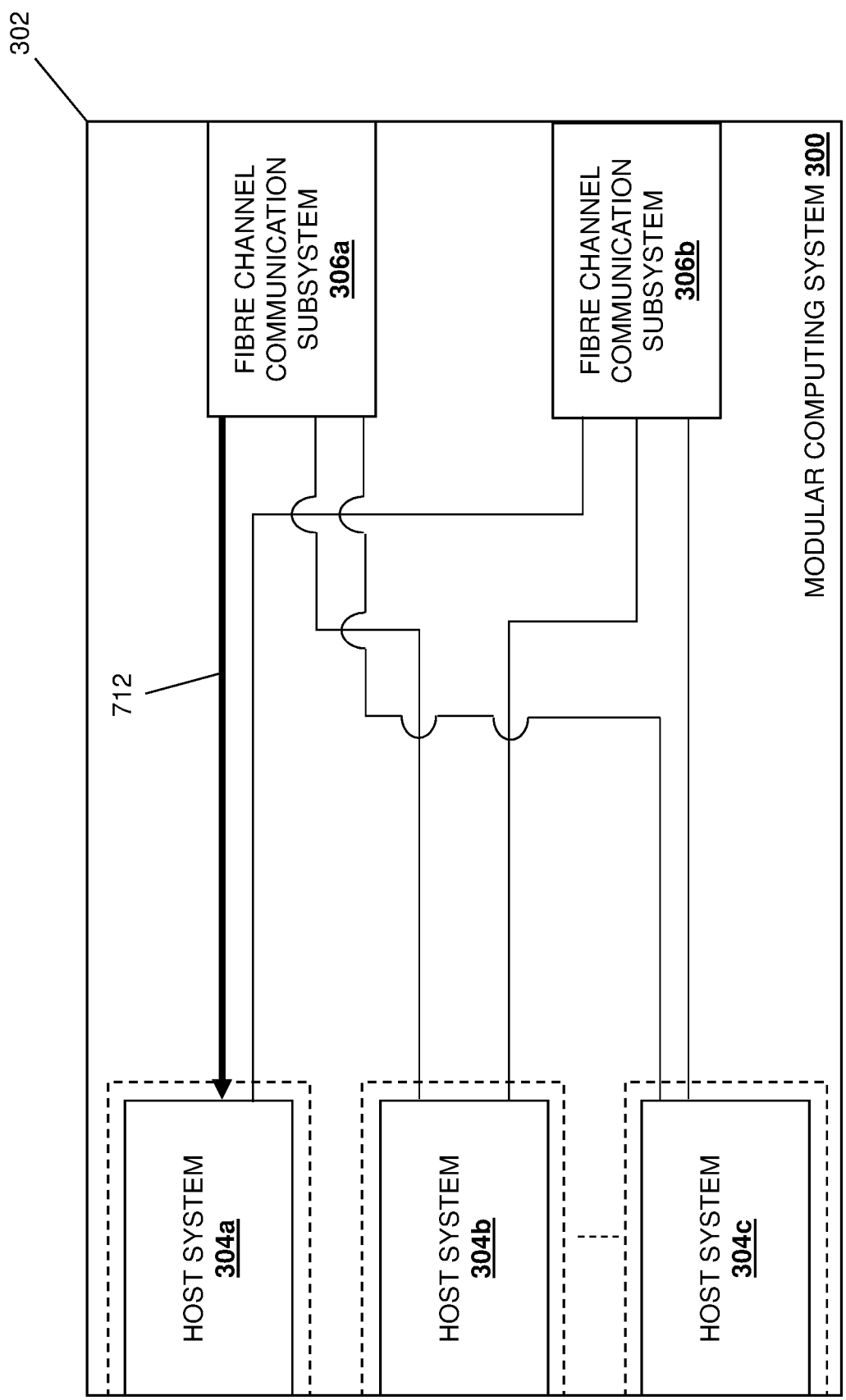
FIG. 12B is a schematic view illustrating an embodiment of the modular computing system of FIG. 3 operating during the method of FIG. 6.
Figure 12C:
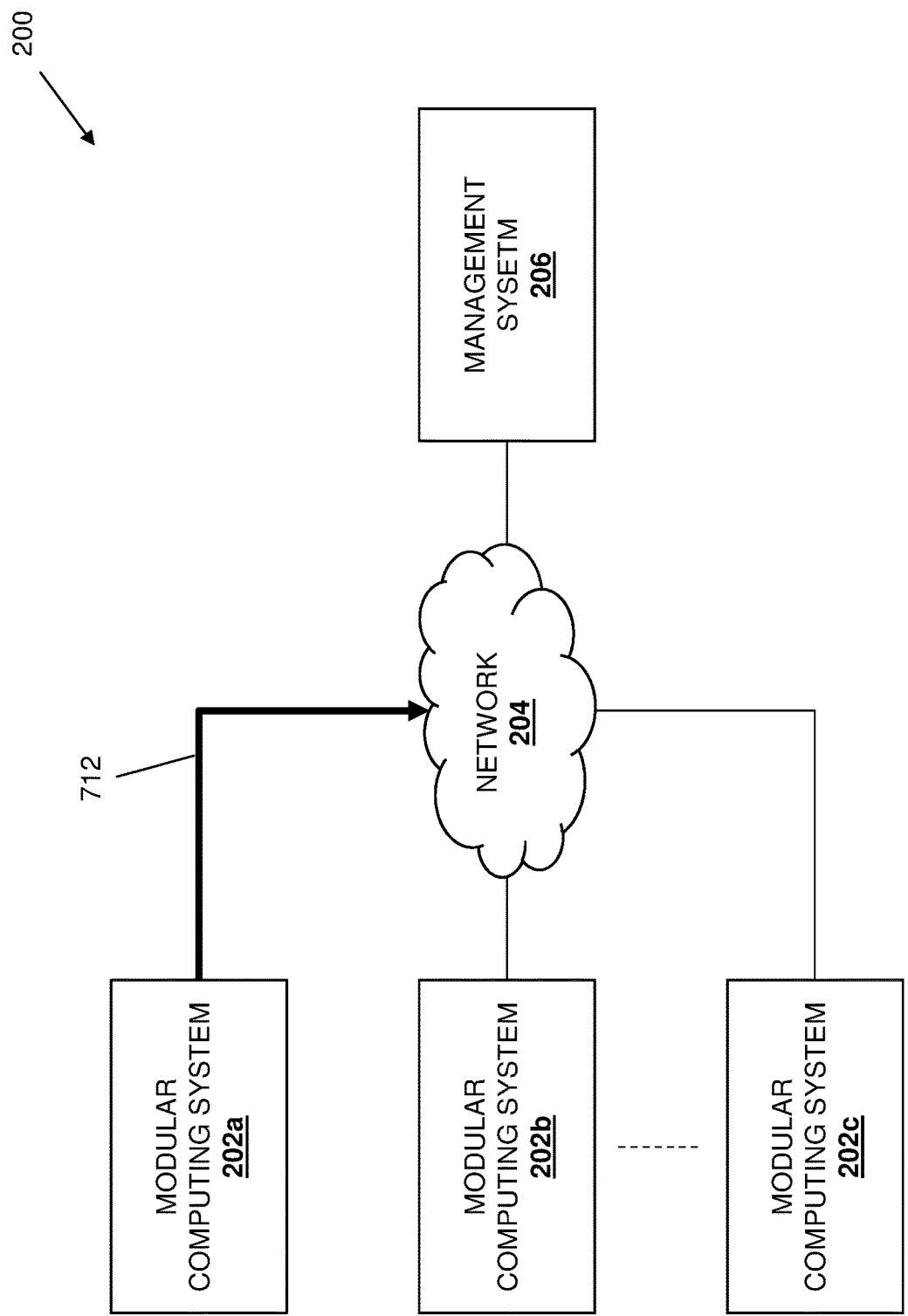
FIG. 12C is a schematic view illustrating an embodiment of the networked system of FIG. 2 operating during the method of FIG. 6.

As such, with reference back to FIG. 7 and returning to block 610, in response to receiving the SDISC ELS communication acknowledgement, the HBA device 404 included in the host system 304*a*/400 in the modular computing system 202*a*/300 may perform Fibre Channel communication operations 712 via the Fibre Channel communication subsystem 306*a*/500 included in (or coupled to) the modular computing system 202*a*/300. For example, as illustrated in FIGS. 12A, 12B, and 12C, the Fibre Channel communication operations 712 may include the HBA engine 404*a* in the HBA device 404 included in the host system 304*a*/400 in the modular computing system 202*a*/300 transmitting Fibre Channel communication via its communication device 404*c* to the Fibre Channel communication subsystem 306*a*/500 included in (or coupled to) the modular computing system 202*a*/300, and the Fibre Channel communication subsystem 306*a*/500 included in (or coupled to) the modular computing system 202*a*/300 transmitting those Fibre Channel communications via the network 204 to their destination.

Thus, systems and methods have been described that utilize a BMC device in a server device to retrieve and provide onboarding information to an HBA device in that server device, which allows that server device to generate and transmit discovery communications (e.g., Extended Link Services (ELS) communications that include the onboarding information) to a Fibre Channel communications subsystem in that server device for use by that Fibre Channel communications system in automatically onboarding the server device for Fibre Channel communications. For example, the server device of the present disclosure may include a BMC device that retrieves and transmits onboarding information associated with the server device to an HBA device in the server device. In response to receiving the onboarding information, the HBA device transmits a discovery communication that includes the onboarding information to a Fibre Channel communication subsystem in the server device. When the HBA device then determines that a discovery acknowledgement communication has been received from the Fibre Channel communication subsystem, it performs Fibre Channel fabric login operations with the Fibre Channel communication system that configure the server device for Fibre Channel communications via the Fibre Channel communication subsystem. As such host system onboarding in Fibre-Channel-based modular systems is automated, which reduces the time and errors associate with manual host system onboarding in conventional Fibre-Channel-based modular systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel host onboarding system, comprising:
a Fibre Channel communication subsystem;
a modular computing system; and
a host system that is included in the modular computing system and coupled to the Fibre Channel communication subsystem, wherein the host system includes:
a Baseboard Management Controller (BMC) device that is configured to:
retrieve host system onboarding information associated with the host system; and
transmit the host system onboarding information;
a Host Bus Adapter (HBA) device that is coupled to the BMC device and that is configured to:
receive, from the BMC device, the host system onboarding information;
transmit, in response to receiving the host system onboarding information, a host system discovery communication that includes the host system onboarding information to the Fibre Channel communication subsystem;
determine that a host system discovery acknowledgement communication acknowledging the host system discovery communication has been received from the Fibre Channel communication subsystem; and
perform, with the Fibre Channel communication subsystem in response to receiving the host system discovery acknowledgement communication, Fibre Channel fabric login operations that configure the host system for Fibre Channel communications via the Fibre Channel communication subsystem.

2. The system of claim 1, wherein the Fibre Channel communication subsystem includes a Fibre Channel Input/Output (I/O) module that is included in the modular computing system.

3. The system of claim 1, wherein the Fibre Channel communication subsystem includes a Fibre Channel Input/Output (I/O) module that is located outside of the modular computing system, and wherein the modular computing system includes:
a Fibre Channel fabric expander module that couples the host system to the Fibre Channel I/O module, wherein the Fibre Channel fabric expander module is configured to:
forward the host system discovery communication received from the HBA device to the Fibre Channel I/O module; and
forward the host system discovery acknowledgement communication received from the Fibre Channel I/O module to the HBA device.

4. The system of claim 1, wherein the host system discovery communication is an Extended Link Services (ELS) communication.

5. The system of claim 1, wherein the HBA device is configured to:
perform, with the Fibre Channel communication subsystem, link initialization operations prior to transmitting the host system discovery communication to the Fibre Channel communication subsystem.

6. The system of claim 1, wherein the host system onboarding information includes at least one host system service identifier and at least one modular computing system slot identifier.

7. An Information Handling System (IHS), comprising:
a processing system; and
a memory system that is coupled to the processing system and that includes instructions that, when executed by the processing system, cause the processing system to provide a Host Bus Adapter (HBA) engine that is configured to:
receive, from a Baseboard Management Controller (BMC) device that is included in the IHS, onboarding information;
transmit, in response to receiving the onboarding information, a discovery communication that includes the onboarding information to a Fibre Channel communication subsystem;
determine that a discovery acknowledgement communication acknowledging the discovery communication has been received from the Fibre Channel communication subsystem; and
perform, with the Fibre Channel communication subsystem in response to receiving the discovery acknowledgement communication, Fibre Channel fabric login operations that configure the IHS for Fibre Channel communications via the Fibre Channel communication subsystem.

8. The IHS of claim 7, wherein the Fibre Channel communication subsystem includes a Fibre Channel Input/Output (I/O) module that is included in the IHS.

9. The IHS of claim 7, wherein the Fibre Channel communication subsystem includes a Fibre Channel Input/Output (I/O) module that is located outside of the IHS, and wherein the IHS includes:
a Fibre Channel fabric expander module that couples the HBA engine to the Fibre Channel I/O module, wherein the Fibre Channel fabric expander module is configured to:
forward the discovery communication received from the HBA engine to the Fibre Channel I/O module; and
forward the discovery acknowledgement communication received from the Fibre Channel I/O module to the HBA engine.

10. The IHS of claim 7, wherein the discovery communication is an Extended Link Services (ELS) communication.

11. The IHS of claim 7, wherein the HBA engine is configured to:
perform, with the Fibre Channel communication subsystem, link initialization operations prior to transmitting the discovery communication to the Fibre Channel communication subsystem.

12. The IHS of claim 7, wherein the onboarding information includes at least one IHS service identifier and at least one IHS slot identifier.

13. The IHS of claim 7, wherein discovery communication includes at least one IHS service identifier, and at least one IHS slot identifier, at least one Fibre Channel communication subsystem service identifier, at least one Fibre Channel communication subsystem slot identifier, and at least one IHS port identifier.

14. A method for onboarding host systems for Fibre Channel communications, comprising:
receiving, by a Host Bust Adapter (HBA) device in a host system included in a modular computing system from a Baseboard Management Controller (BMC) device in the host system, host system onboarding information;

transmitting, by the HBA device in response to receiving the host system onboarding information, a host system discovery communication that includes the host system onboarding information to a Fibre Channel communication subsystem;

determining, by the HBA device, that a host system discovery acknowledgement communication acknowledging the host system discovery communication has been received from the Fibre Channel communication subsystem; and performing, by the HBA device with the Fibre Channel communication subsystem in response to receiving the host system discovery acknowledgement communication, Fibre Channel fabric login operations that configure the host system for Fibre Channel communications via the Fibre Channel communication subsystem.

15. The method of claim 14, wherein the Fibre Channel communication subsystem includes a Fibre Channel Input/Output (I/O) module that is included in the modular computing system.

16. The method of claim 14, wherein the Fibre Channel communication subsystem includes a Fibre Channel Input/Output (I/O) module that is located outside of the modular computing system, and wherein the method further includes:

forwarding, by a Fibre Channel fabric expander module that couples the host system to the Fibre Channel I/O module, the host system discovery communication received from the HBA device to the Fibre Channel I/O module; and forwarding, by the Fibre Channel fabric expander module, the host system discovery acknowledgement communication received from the Fibre Channel I/O module to the HBA device.

17. The method of claim 14, wherein the host system discovery communication is an Extended Link Services (ELS) communication.

18. The method of claim 14, further comprising:

performing, by the HBA device with the Fibre Channel communication subsystem, link initialization operations prior to transmitting the host system discovery communication to the Fibre Channel communication subsystem.

19. The method of claim 14, wherein the host system onboarding information includes at least one host system service identifier and at least one modular computing system slot identifier.

20. The method of claim 14, wherein discovery communication includes at least one host system service identifier, and at least one modular computing system slot identifier, at least one Fibre Channel communication subsystem service identifier, at least one Fibre Channel communication subsystem slot identifier, and at least one host system port identifier.

* * * * *